US012561497B2

(12) United States Patent
Phan et al.

(10) Patent No.: US 12,561,497 B2
(45) Date of Patent: *Feb. 24, 2026

(54) AUTOMATED OPERATING MODE DETECTION FOR A MULTI-MODAL SYSTEM WITH MULTIVARIATE TIME-SERIES DATA

(71) Applicant: International Business Machines Corporation, Armonk, NY (US)

(72) Inventors: Dzung Tien Phan, Pleasantville, NY (US); Robert Jeffrey Baseman, Brewster, NY (US); Dhavalkumar C. Patel, White Plains, NY (US); Fateh A. Tipu, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 965 days.

This patent is subject to a terminal disclaimer.

(21) Appl. No.: 17/686,708

(22) Filed: Mar. 4, 2022

(65) Prior Publication Data

US 2023/0281364 A1 Sep. 7, 2023

(51) Int. Cl.
*G06F 30/27* (2020.01)
*G06F 111/08* (2020.01)

(52) U.S. Cl.
CPC .......... *G06F 30/27* (2020.01); *G06F 2111/08* (2020.01)

(58) Field of Classification Search
CPC ....... G06F 30/27; G06F 2111/08; G06F 30/15
See application file for complete search history.

(56) References Cited

U.S. PATENT DOCUMENTS

| | | | |
|---|---|---|---|
| 2019/0130659 A1 | 5/2019 | Ide et al. | |
| 2019/0244622 A1* | 8/2019 | Borkar | G10L 17/16 |
| 2020/0057956 A1 | 2/2020 | Phan et al. | |
| 2021/0066141 A1 | 3/2021 | Phan et al. | |

(Continued)

OTHER PUBLICATIONS

R. Baseman et al., "Applications of Graphical Gaussian Models for Process Control," Proc. Advanced Process Control Conference, APC 2019, Texas, Oct. 28-31, 2019, pp. 1-30.

(Continued)

*Primary Examiner* — Kuang F Chen
(74) *Attorney, Agent, or Firm* — Scully, Scott, Murphy & Presser, P.C.; Jordan Schiller

(57) ABSTRACT

A system and method for learning a predictive function that can automatically learn different operating modes for a multi-modal system and predict the number of operating states for a multi-modal system and additionally the detailed structure for each state. Once learned, the predictive function (model) can be used to determine a mode of a new sample (an asset). Based on the determined components that maximize a log likelihood function, a mode of the new sample is detected into the model via dependency graphs. One aspect includes enforcing a lower bound for the number of sample points to form an operational mode for an asset. While a mode relates to sample points which maximizes like log-likelihood, an ability is provided to remove artifact modes due to noisy data by considering a sufficient sample data condition and maximizing log-likelihood. Domain knowledge can be incorporated into the model via dependency graphs.

19 Claims, 16 Drawing Sheets

(56)                References Cited

U.S. PATENT DOCUMENTS

2021/0117836 A1      4/2021  Phan et al.

OTHER PUBLICATIONS

D. Phan and T. Ide, "L0-Regularized Sparsity for Probabilistic Mixture Models", Proc. 2019 SIAM International Conference on Data Mining, 2019, Society for Industrial and Applied Mathematics, pp. 172-180.
D. Phan et al., "A Novel L0-Constrained Gaussian Graphical Model for Anomaly Localization," 2017 IEEE International Conference on Data Mining Workshops (ICDMW), 2017, pp. 830-833.
T. Ide et al., "Multi-task Multi-modal Models for Collective Anomaly Detection," 2017 IEEE International Conference on Data Mining (ICDM), 2017, pp. 177-186.
D. Phan and M. Menickelly, "On the solution of L0-constrained sparse inverse covariance estimation problems." Informs Journal on Computing, 33, No. 2, 2021, pp. 531-550.

\* cited by examiner $$p(x) = \sum_{k=1}^{K} \pi_k N(x|\mu_k, \Sigma_k)$$

<u>300</u>
<u>320</u>
Multi-variate data
<u>330</u>
Multi-variate Gaussian distribution
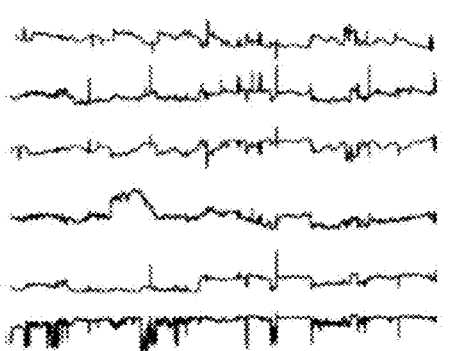
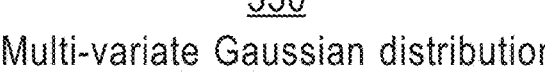
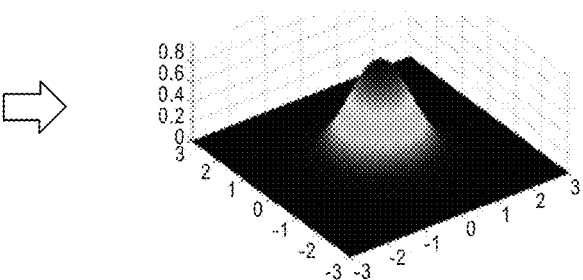
$$D = \{x_1, \ldots, x_N\} \subseteq R^p$$
$$p(x; \mu, \Sigma) = \frac{1}{(2\pi)^{\frac{p}{2}} |\Sigma|^{\frac{1}{2}}} \exp\left(-\frac{1}{2}(x - \mu)^T \Sigma^{-1}(x - \mu)\right)$$
<u>350</u>
Sparse graphical model
FIG. 4
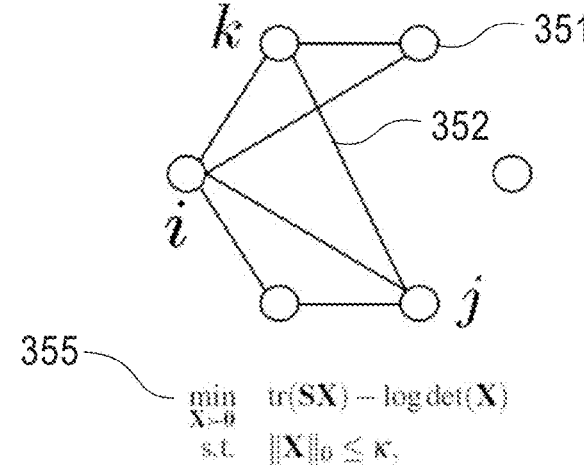
$$\min_{X \succ 0} \quad \mathrm{tr}(SX) - \log\det(X)$$
$$\text{s.t.} \quad \|X\|_0 \leq \kappa,$$

V: Velocity
R: RPM
B: Brake Pedal
FA: Forward Accelerator
SW: Steering Wheel
GP: Gas Pedal <u>900</u>

---

Mode Fidelity Mixture Model (MFM)

--- procedure MFM($\lambda$, $\beta$, $\ell$ )

$\left.\begin{array}{l} \text{Initialize } \{(\mu_k, \Sigma_k)\} \text{ by the } k\text{-Mean algorithm} \\ \text{Set } \pi_k = 1/k \text{ for all } k \end{array}\right\}$ 902

905 $\Big\{$ repeat

910 $\Big\{$    $r_k^n \leftarrow$ Eq. (1) —— 912 for $k \leftarrow 1, K$ do

$\left.\begin{array}{l} N_k \leftarrow \Sigma_{n=1}^{N} \; r_k^n \\ \mu_k \leftarrow 1/N_k \; \Sigma_{n=1}^{N} \; r_k^n x_n \\ \hat{S}_k \leftarrow 1/N_k \; \Sigma_{n=1}^{N} \; r_k^n (x_n - \mu_k)(x_n - \mu_k)^T \end{array}\right\}$ 915 end for

$\pi \leftarrow$ SWSA($r_k^n$ , $\lambda$) —— 920

$\Sigma_k \leftarrow$ SGGM($\hat{S}^k$, $\beta$) —— 921 until convergence return $\{\pi_k\}$ and $\{\mu_k, \Sigma_k\}$ —— 925 end procedure

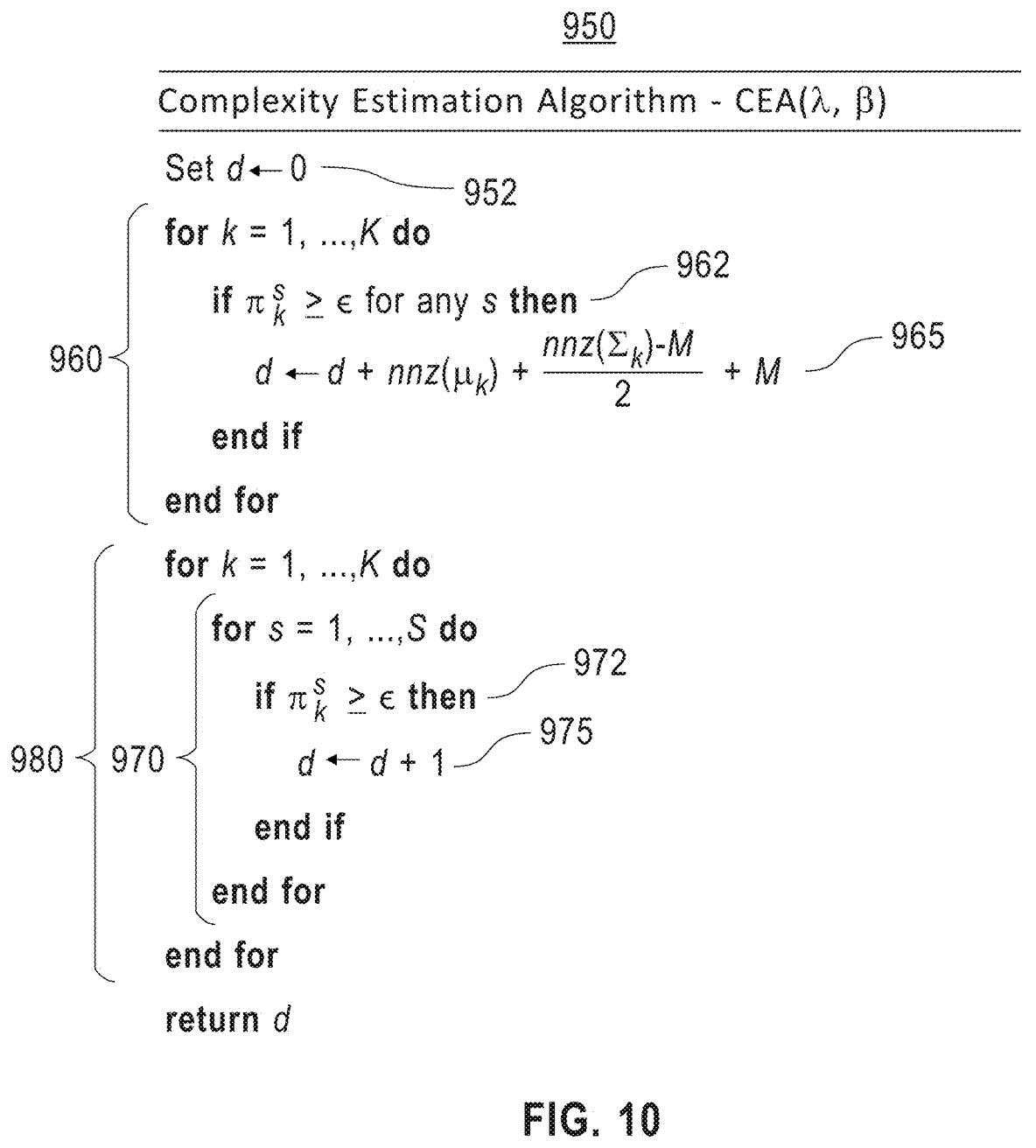

$\underline{950}$

| Complexity Estimation Algorithm - CEA($\lambda$, $\beta$) |
| :--- |

Set $d \leftarrow 0$ ⸺ 952 for $k$ = 1, ...,$K$ do if $\pi_k^s \geq \epsilon$ for any $s$ then ⸺ 962

$d \leftarrow d + nnz(\mu_k) + \dfrac{nnz(\Sigma_k)\text{-}M}{2} + M$ ⸺ 965 end if end for

960 for $k$ = 1, ...,$K$ do for $s$ = 1, ...,$S$ do if $\pi_k^s \geq \epsilon$ then ⸺ 972

$d \leftarrow d + 1$ ⸺ 975 end if end for end for return $d$ 980  970

FIG. 10

AUTOMATED OPERATING MODE DETECTION FOR A MULTI-MODAL SYSTEM WITH MULTIVARIATE TIME-SERIES DATA

FIELD

The present disclosure relates generally to a method and system for identifying operating models of assets and anomaly detection relating to operations of assets, e.g., industrial equipment such as semiconductor manufacturing. More particularly, there is provided a system employing a multi-modal predictive model for learning a density function for a cohort of non-stationary assets using a graphical mixture model.

BACKGROUND

Keeping good operational conditions of industrial equipment is a major business interest across many industries. Although detecting indications of system malfunctions from noisy sensor data is sometimes challenging even to seasoned engineers, statistical machine learning has a lot of potential to automatically capture major patterns of operating conditions.

An asset, e.g., industrial equipment, in particular, often operate in several states or modes. In a typical setting, multivariate time-series sensor data from multiple physical sensors is taken as the input to traditional Gaussian Graphical models (GGM) or Gaussian Mixture models (GMM) learning prediction functions that are used to compute anomaly scores, i.e., numerical values representing the degree of anomalousness behavior of an operational state. Human administrators may then decide to take actions to mitigate the risk to an asset e.g., service interruptions.

The graphical model GMM are used to identify operating models of assets. Each Gaussian component is considered as an operating mode for an asset. Given a data point x, the operating mode is related to the Gaussian with the highest probability.

Existing GGM and GMM models however cannot handle both multi-modality and multi-assets. For example, while traditional Gaussian mixture models for respective tasks performed by assets can handle multi-modality, they currently disregard the individuality of the tasks (all assets must have the same model). Due to noisy data, traditional Gaussian mixture models can inaccurately identify an operating mode. Further existing GGM-based single-modal models for respective assets cannot handle the multi-modality since their goal is to find a single precision matrix on a task-wise basis.

SUMMARY

In one aspect, there is provided a data-driven method for detecting operational states of an asset, e.g., industrial equipment, learn a predictive model, and take control actions to change an asset's characteristics.

In an embodiment, a system and method are provided for learning a different prediction function or model customized for each individual asset or asset cohorts and detecting multiple modes for each individual asset. Such a model is herein referred to as a Mode Fidelity Mixture (MFM) model In embodiments, the system and methods are configured to monitor a collection of many assets, including assets that are similar but not identical, as they may operate subject to different operating conditions or modes. The system and methods provide for a more comprehensive monitoring that leverages the commonality of those assets while paying attention to the individuality of each.

In one aspect, there is provided a method for evaluating a state of an asset. The method comprises: receiving, at one or more hardware processors, plural multivariate time-series data values representing variables associated with a performance of the asset; running, using the one or more the hardware processors, a multi-modal prediction model trained to determine an operation mode of the asset based on the received plural multivariate time-series data values; comparing, using the one or more the hardware processors, a determined operating mode of the asset against known operating modes of the asset or asset cohort; detecting, using the one or more the hardware processors, whether or not the asset exhibits an anomalous behavior based on the comparing; and invoking, using the one or more the hardware processors, in response to detecting anomalous behavior, an investigation into a cause for the anomalous behavior of the asset.

In a further embodiment, there is disclosed a system for evaluating a state of an asset. The system comprises: a hardware processor and a non-transitory computer-readable memory coupled to the processor, wherein the memory comprises instructions which, when executed by the processor, cause the processor to: receive plural multivariate time-series data values representing variables associated with a performance of the asset; run a multi-modal prediction model trained to determine an operation mode of the asset based on the received plural multivariate time-series data values; compare a determined operating mode of the asset against known operating modes of the asset or asset cohort; detect whether or not the asset exhibits an anomalous behavior based on the comparing; and invoke, in response to detecting anomalous behavior, an investigation into a cause for the anomalous behavior of the asset.

In a further aspect, there is provided a computer program product for performing operations. The computer program product includes a storage medium readable by a processing circuit and storing instructions run by the processing circuit for running a method. The method is the same as listed above.

BRIEF DESCRIPTION OF THE DRAWINGS

FIG. 4 depicts an anomaly detection approach that makes use of single-mode sparse Gaussian graphical model (GGM) approach as a basic building block in an embodiment;

FIG. 9 is an exemplary methodology for building a Mode Fidelity Mixture prediction Model (MFM) for an asset in accordance with an embodiment;

FIG. 10 depicts an exemplary complexity estimation method for determining model complexity in one embodiment;

DETAILED DESCRIPTION

In embodiments, a system and method is provided for automated operating mode detection for a multi-modal asset or a fleet (cohorts) of multi-modal assets, e.g., industrial equipment that operates in several operational states. In particular, a data-driven method detects the operational states for the asset or fleet of assets. The method includes building a multi-modal predictive model for learning a density function for a cohort of non-stationary assets by using a graphical mixture model. The method enforces a lower bound for the number of sample points to form an operational mode for an asset, the operational modes being discovered by looking at the structures of dependency graphs.

Additionally, a data driven method for collaborative learning for a fleet of assets is provided and in particular, the learning of a prediction function customized for each individual asset of a fleet of assets, and detecting multiple modes for each individual asset.

The system and method is applied for anomaly detection by learning a density function for a multi-modal system. While a mode relates to sample points which maximizes like log-likelihood, one embodiment of the present disclosure is the additional ability to remove artifact modes due to noisy data by considering the sufficient sample data condition and maximizing log-likelihood. The system and method can thus predict the number of operating states as well as the detailed structure for each state. A sample point is anomalous if the likelihood is small, i.e., less than some threshold. The method for anomaly detection can better handle noisy data due to the removal of artifact modes and sparse Gaussian mixture components. Further, the system and method can use domain knowledge to construct an operating mode by incorporating domain knowledge into the model via constraining dependency graphs.

A first illustrative and non-limiting use-case is an instance of multi-modality for a non-station system in a semiconductor manufacturing tool. An industrial equipment often operates in several modes and the data-driven method for detecting modes uses multivariate time-series sensor data such as the example data shown in the table shown in FIG. 1.

Figure 1:
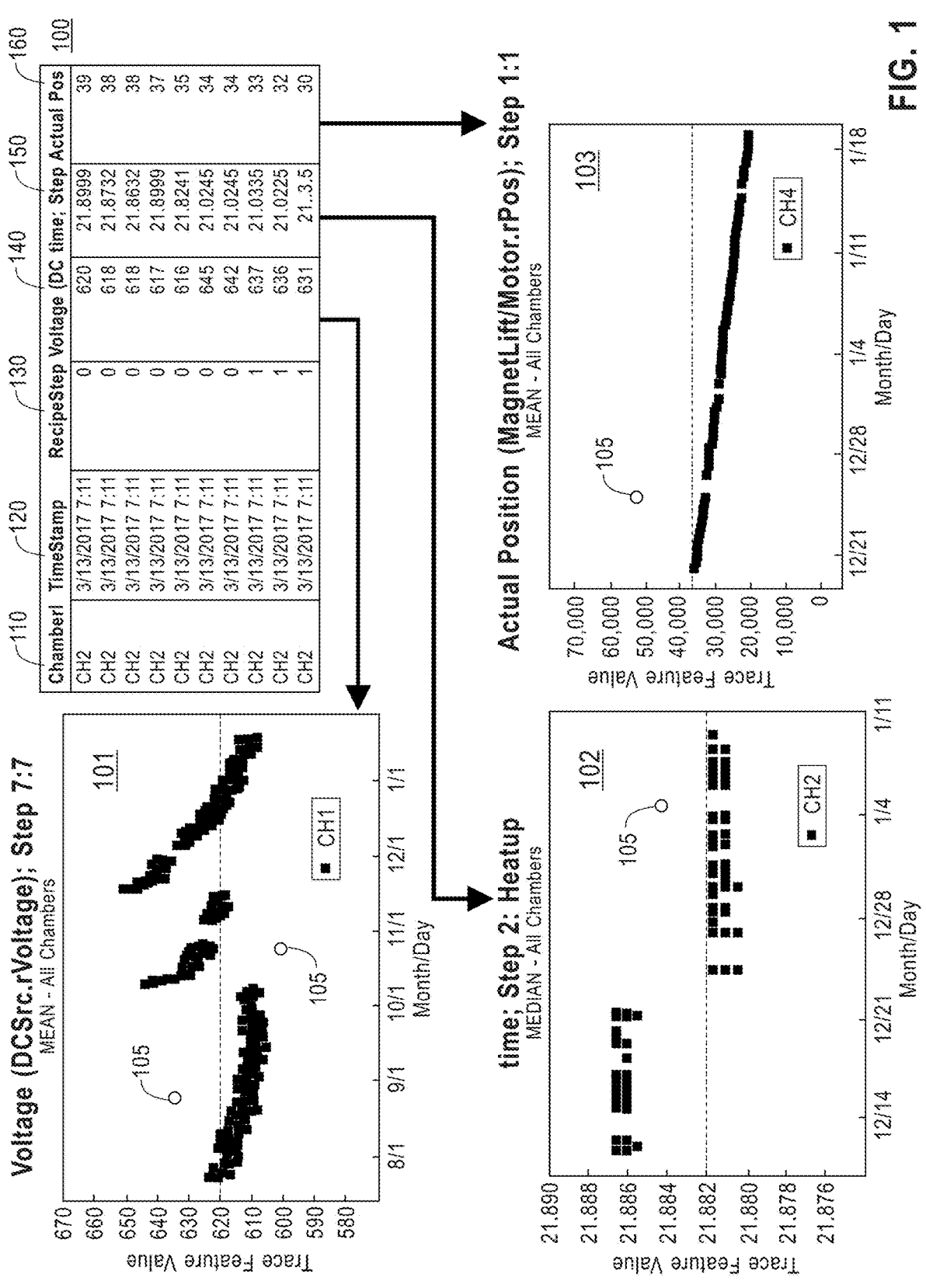
FIG. 1 depicts a chart showing example time series sensor measurements of several process variables including outliers for an exemplary integrated circuit (IC) fabrication process.

FIG. 1 depicts example time series sensor measurements 100 for an exemplary integrated circuit (IC) fabrication process. FIG. 1 illustrates a further corresponding graph 101 showing a periodic related normal variable with outliers 105, a graph 102 showing multimodal normal variable with outliers, and a graph 103 showing a drifting normal variable with outlier.

More particularly, FIG. 1 shows various variables in columns 110-160, with the rows corresponding to respective executions (runs) of the process (recipe). Column 110 shows the chamber ID. These variables are the same for all of the rows shown in FIG. 1. Although not shown in FIG. 1, embodiments may also include a wafer ID and/or a tool ID. Column 120 shows the time stamp, and column 130 shows the recipe step. Column 140 shows a voltage, column 150 shows a time to heat-up, and column 160 shows a lift motor position. Each row in FIG. 1 contains a unique value for each of these values, although one skilled in the art would understand that duplicate values are possible.

FIG. 1 further shows a graph 101 showing a periodic related normal variable. Specifically, graph 101 shows a mean direct current source voltage DCSrc.rVoltage, for Chamber 1 (CH1) in Step 7 for executions of the process on different dates. Thus, each of the squares shown in chart 101 of FIG. 1 represents a voltage value (y-axis) for an execution of the process on a given date (x-axis), with many dates having multiple executions and hence multiple values for that date. FIG. 1 graph 101 shows that this voltage value is a periodic related normal variable: there is a repeated pattern of the variable abruptly increasing (e.g., to above 640 volts at least starting around October 10), then gradually decreasing (e.g., to below 620 volt at least until around November 15), before abruptly increasing again (e.g., to above 650 volt at least starting around November 15), followed by another gradual decrease (e.g., to below 610 volt at least until around January 15), and so on. Graph 101 of FIG. 1 also includes values, shown as circles 105 rather than squares, which are outliers relative to the aforementioned periodic related normal pattern.

FIG. 1 further shows a graph 102 showing a multimodal normal variable. Specifically, graph 102 of FIG. 1 is a median heat-up time for Chamber 2 (CH2) in Step 2 for executions of the process on different dates. Thus, each of the squares shown on graph 102 of FIG. 1 further shows a heat-up time value (y-axis) for an execution of the process on a given date (x-axis), with many dates having multiple executions and hence multiple values for that date. Graph 102 of FIG. 1 shows that this heat-up time value is a multimodal normal variable: the variable clusters within a first range during a first period (between 21.885 seconds and 21.887 seconds until December 21 starting at least from December 10), then clusters within a second range during a second period (between 21.880 seconds and 21.882 seconds starting from December 22 at least until January 11). Graph 102 of FIG. 1 shows also includes values, shown as circles 105 rather than squares, which are outliers relative to the afore-mentioned multimodal normal pattern.

FIG. 1 further shows a graph 103 showing a drifting normal variable. Specifically, Graph 103 of FIG. 1 shows a mean actual position of a magnet lift motor (MagNetLift/Motor.rPos) for Chamber 4 (CH4) in Step 1 of an (Amber Lamp First Warmup recipe) for executions of the process on different dates. Thus, each of the squares shown on graph 103 of FIG. 1 represents a mean actual position (y-axis) for an execution of the process on a given date (x-axis), with many dates having multiple executions and hence multiple values for that date. Graph 103 of FIG. 1 shows that this mean actual position value is a drifting normal variable: the variable gradually decreases at a steady rate (e.g., constant slope), e.g., from approximately 37 mm on or before December 21, to approximately 20 mm on or after January 18. Graph 103 of FIG. 1 also includes values, shown as circles 105 rather than squares, which are outliers relative to the afore-mentioned drifting normal pattern.

Figure 2B:
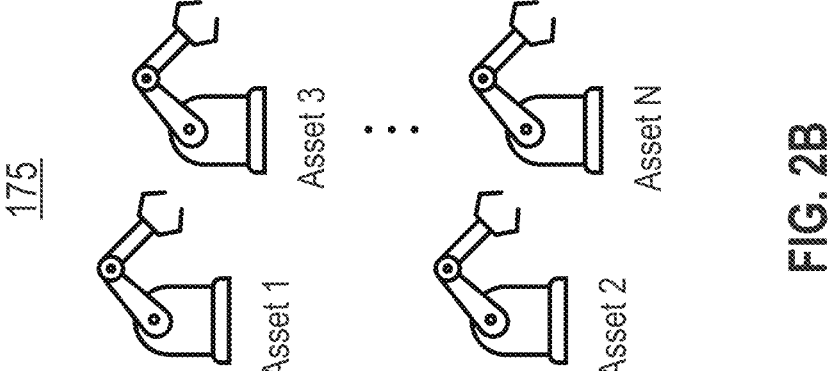
FIGS. 2A and 2B shows respective exemplary fleet of assets such as wind turbines (FIG. 2A) and vessel engines (FIG. 2B) which respective asset fleets are typically managed and subject to a cohort analysis.
Figure 2A:
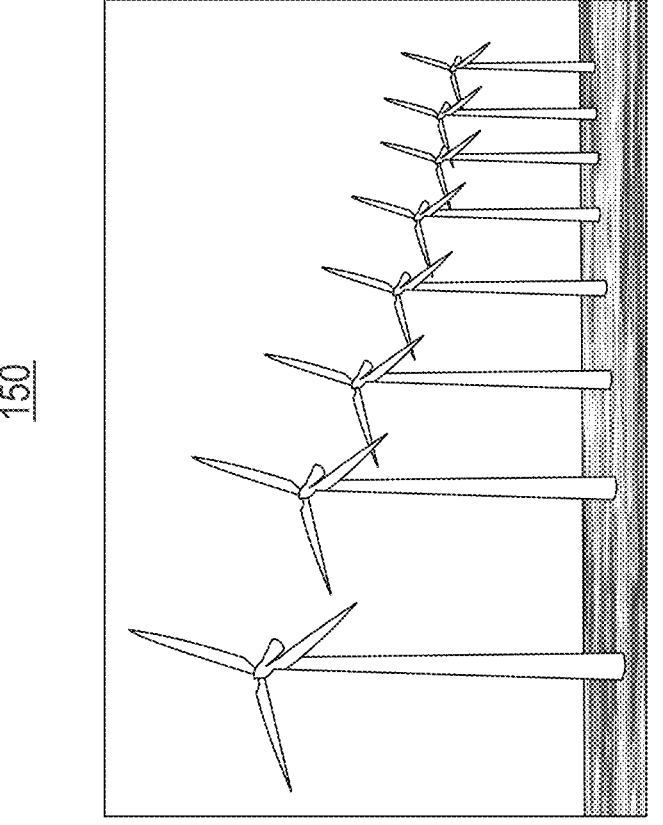

In a second use-case scenario, production equipment is typically managed as a cohort. FIG. 2A shows fleet of assets such as wind turbines 150 and FIG. 2B shows a fleet of vessel engines 175. In a cohort analysis approach, data is collected from such fleet of assets that can be used to automatically capture commonality and individuality of the assets. The cohort analysis approach enables collective condition-based management.

Figure 3A:
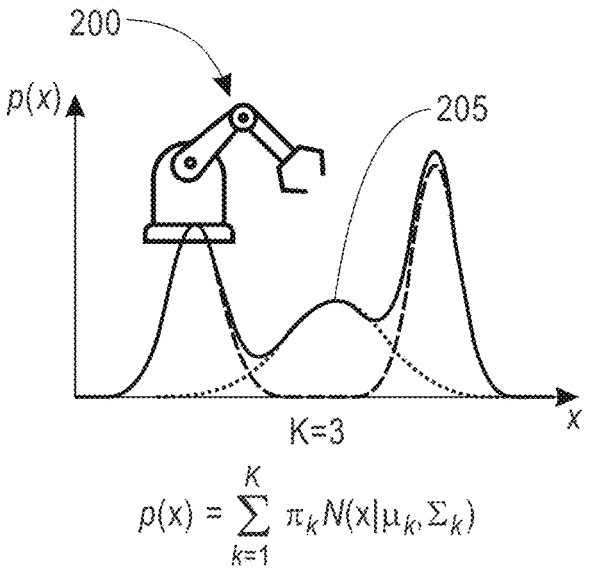
FIGS. 3A and 3B conceptually depict a data-driven method for detecting operations states for a fleet of assets with FIG. 3A showing an operational mode detecting of an individual asset and FIG. 3B showing the performing of collaborative learning for multiple assets of a fleet of assets (e.g., common models)
Figure 3B:
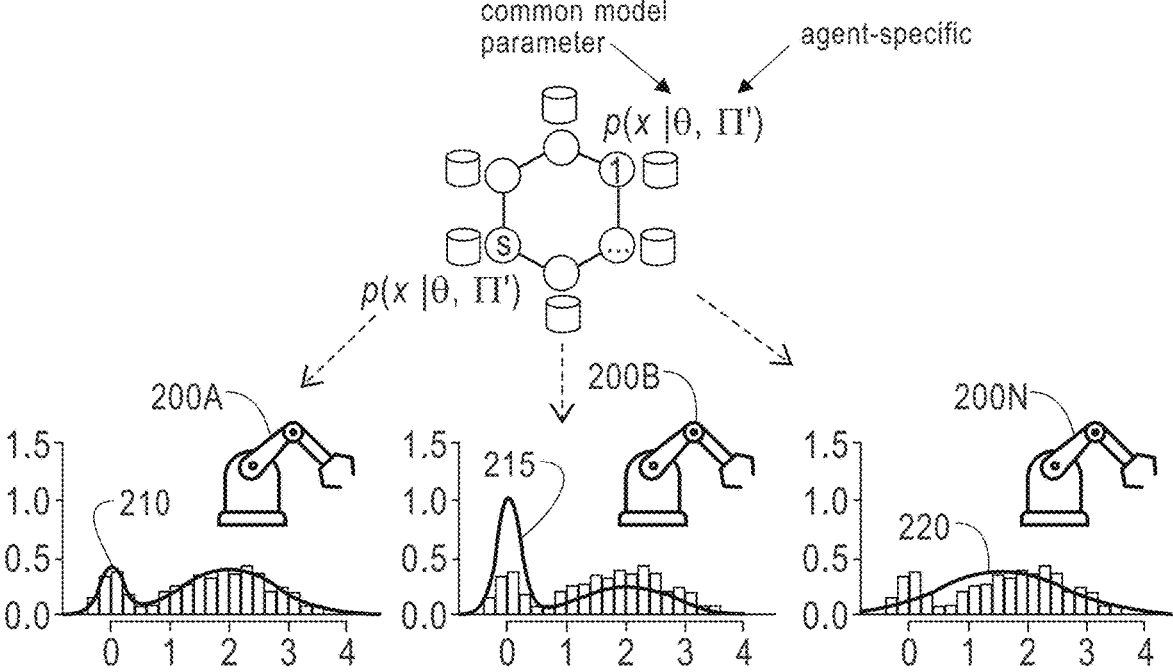

However, existing methods for anomaly detection cannot simultaneously handle multi-modality and multiple assets. FIGS. 3A-3B conceptually depicts the data-driven method for detecting operations states for a fleet of assets. In FIG. 3A, there is shown the operational mode detecting of an individual asset 200 and the learning of a corresponding prediction function p(x) 205 from the multivariate data generated by use of that asset 200. The prediction function 205 is learned by Gaussian mixture models (GMM) that can handle multi-modality. FIG. 3B depicts the performing of collaborative learning for multiple assets 200A, 200B, . . . , 200N of the fleet of assets (e.g., using common model parameters (i.e., Gaussian graphical models) for all assets), each asset shown having a different corresponding prediction function 210, 215, 220 (e.g., separate weights (i.e., mixture weights) for model parameters) respectively that makes use of data from other assets. Each prediction function is shown as a curve 210, 215, 220 plotted as a probability density value (vertical-axis) as a function of variable data (e.g., temperature sensor data) (horizontal axis). The collaborative learning provides the individual asset prediction functions for each asset by making use of the data from the other assets. Each prediction function can handle multi-modality.

The embodiments described herein utilize a multi-asset multi-modal (MAMM) model to capture multi-modality in a task-dependent fashion as shown as the MAMM models at density functions 210, 215, 220 for different assets 200A, 200B, . . . , 200N. That is, the systems and methods herein use a GGM-based MAMM model built to capture both individuality and commonality of assets, including automatically capturing multiple operational states, and further, is capable of handling the multi-modality while taking advantage of asset-relatedness such that the modeling is applicable to multivariate systems.

FIG. 4 shows an embodiment that makes use of single-mode sparse Gaussian graphical model (GGM) approach 300 as the basic building block in the MAMM model. The GGM approach may begin with multivariate (e.g., multidimensional) data 320. If univariate data is provided, it is converted to multivariate (e.g., three-dimensional) data 320 using temporal information. Each data point may be considered in a three-dimensional space, comprising the observation value, the timestamp t, and a function of the gaps between the observation value and one or more other values (e.g., one or more values preceding and/or following the observation value).

Whether provided directly or indirectly through conversion of univariate data (not shown), multivariate data 320 is used to determine a multivariate Gaussian distribution 330 which is used to determine a sparse graphical model 350, which may be, for example, a Gaussian graphical model (GGM) and/or a Gaussian mixture model (GMM) as further discussed below. In some embodiments, the one or more sparse graphical models 350 may comprise one or more doubly-sparse multi-asset multi-modal Gaussian graphical models (MAMM GGMs), learned from data based on a Bayesian formulation. The double-sparsity may include sparsity in the dependency structure of the GGM and sparsity over the mixture components.

Within a given GGM graph, such as that denoted by 350 in FIG. 4, the nodes 351 represent variables, and the lines 352 represent non-zero (positive or negative) dependencies between variables. Some embodiments of the graph may use a solid line to denote a positive dependency and a dashed line to denote a negative dependency. Some embodiments may depict the strength of dependencies by the thickness of the connecting lines, with a thicker line denoting a stronger dependency. The dependency information are correlation coefficients captured by the GGM model and provides a summary capturing the states, e.g., the normal state, of the particular system. The normal state of operations is a mixture of different dynamic conditions which is captured by the GGM graphs. This dependency information is useful to understand variable insights.

One sparse representation 355 for noise reduction and interpretability is the sparse inverse covariance X obtained by solving the following:

$$X = \underset{X>0}{\operatorname{argmin}} tr(SX) - \operatorname{logdet}(X)$$

$$\text{s.t. } \|X\|_0 \leq \beta$$

for some sparsity model parameter $\beta > 0$, which is the maximal allowable number of non-zero entries in X. $\|X\|_0$ counts the number of non-zero entries in X. S represents a dense (empirical) covariance:

$$S = \frac{1}{N} \sum_{i=1}^{N} (x_i - \mu)(x_i - \mu)^T$$

where $D = \{x_1, \ldots, x_N\} \subseteq R^p$ is the historical data and $\mu$ is the mean of the dataset.

As previously noted, sparse graphical model 350 may comprise a Gaussian graphical model (GGM) and, more specifically, a Gaussian mixture model (GMM). A GMM is a probability distribution p(x) formed as a weighted sum of K single component Gaussian densities and/or distributions x:

$$p(x) = \Sigma_{k=1}^{K} \pi_k \mathcal{N}(x|\mu_k, \Sigma_k)$$

$$\forall k: \pi_k \geq 0, \text{ and}$$

$$\Sigma_{k=1}^{K} = \pi_k = 1$$

where irk is the mixing coefficient or mixture weights, and $\mathcal{N}(x|\mu_k, \Sigma_k)$ is the component, where $\mu_k$ is the mean and $\Sigma_k$ is the covariance matrix. The inverse of the covariance, $\Sigma_k^{-1} = \Lambda_k$, is the precision matrix. As irrelevant components can be mistakenly included in the training model, an embodiment includes the removing of the irrelevant components by a sparse model for mixture weights Irk.

Figure 5:
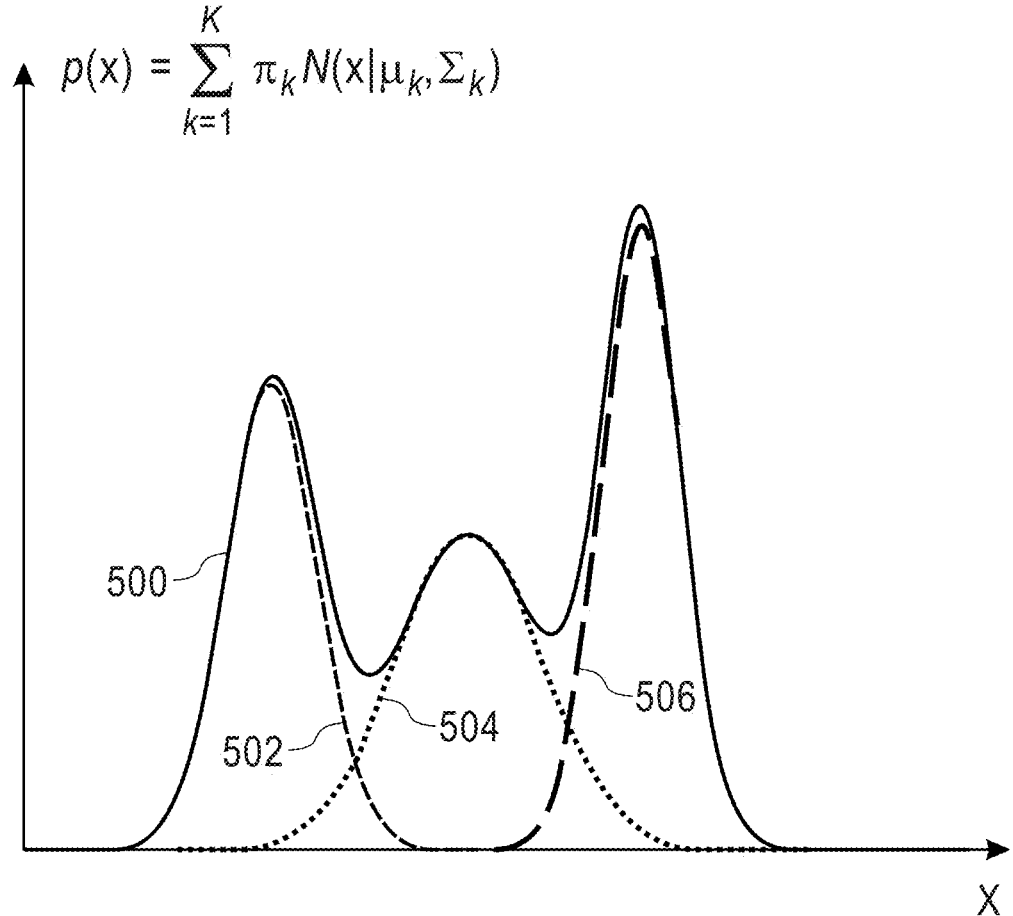
FIG. 5 depicts aspects of a Gaussian mixture model (GMM) usable with an aspect of the present disclosure.

FIG. 5 depicts aspects of a Gaussian mixture model (GMM) usable with an aspect of the present invention. The x-axis represents x, and the y-axis represents p(x), which may be a probability distribution. In FIG. 5, K=3, i.e., there are 3 single component Gaussian distributions 502, 504, 506. The line 500 indicates the GMM composed of the weighted sum of components 502, 504, 506 from the multivariate data of a multimodal system. A GMM learns a distribution for the entire data received from the assets (e.g., a fleet of assets). For each asset, the system builds a respective learned prediction model based upon data received from its use and operation. Each learned prediction model is generated according to different GMMs corresponding to the asset's respective modes of operation.

Figure 6:
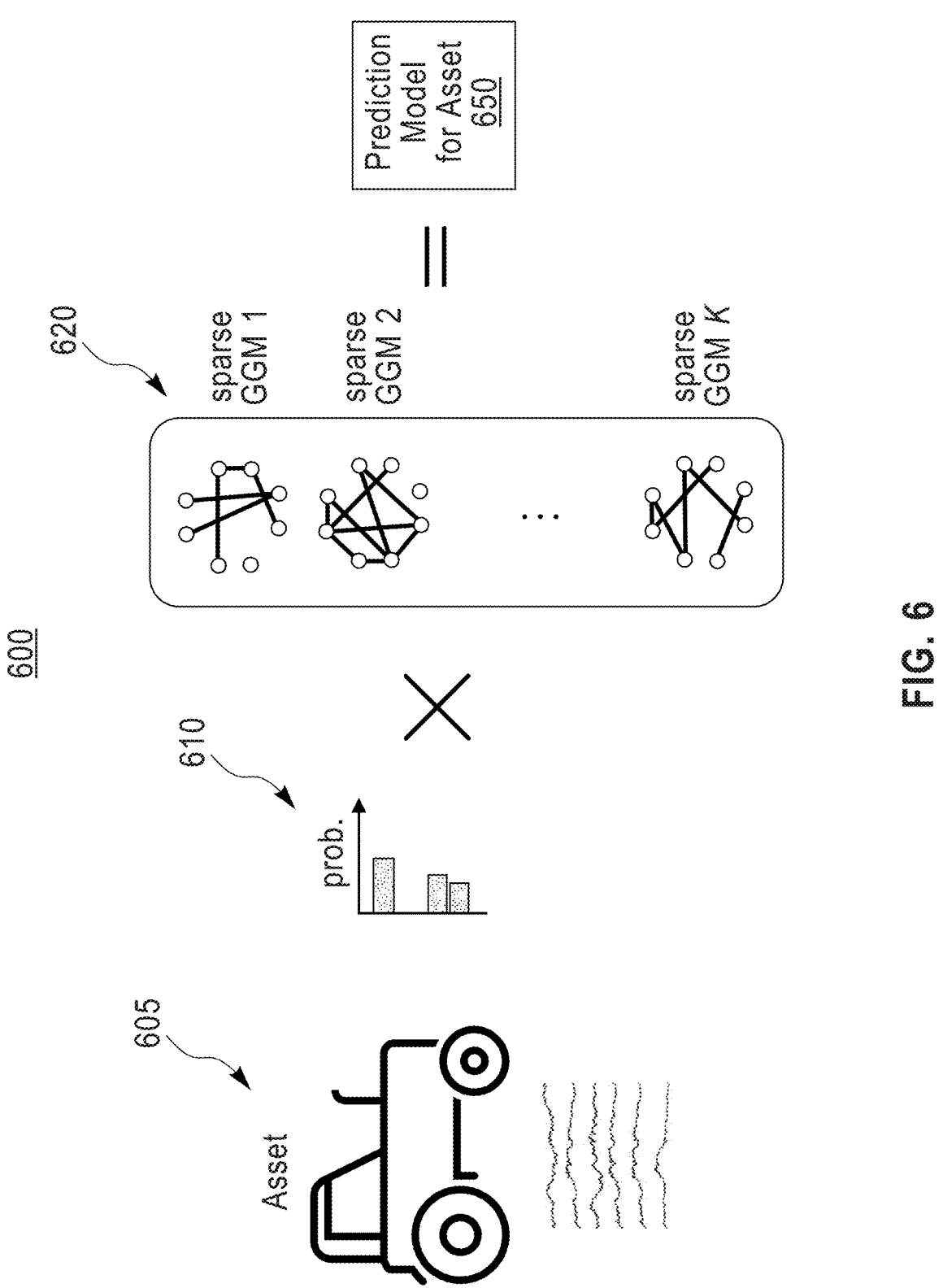
FIG. 6 conceptually depicts a basic modeling strategy wherein a resulting learned prediction model automatically learns different operating modes for a multimodal system, e.g., an asset.

FIG. 6 conceptually depicts a basic modeling strategy 600, wherein a resulting learned prediction model 650 automatically learns different operating modes for a multimodal system, e.g., an asset such as a tool 605. The different operating modes of the tool is represented as a mixture of sparse GGMs. As a non-limiting example, FIG. 6 shows an asset, e.g., a tractor 605 having multiple operating modes (probability distributions) with the modes 620 represented as a corresponding individual sparse GGMs, e.g., labeled GGM 1, GGM 2, . . . , GGM K. Asset 605 may consist of many distinct parts, and individual parts may be monitored with multiple sensors. Since distinct parts in a system (asset) are not necessarily independent, multivariate signals from each sensor in the asset must be analyzed in a multivariate fashion. In an embodiment, from the sensor network, the multivariate time-series data associated with each individual asset are input to a computer system providing a model build framework configured to invoke instructions for detecting operational states for the assets.

In an embodiment, this model build process is performed for each asset cohort, e.g., of a fleet of assets and a respective prediction monitor model 650 is built for reach asset for subsequent use as a monitoring model for the asset.

The building of a model 650 includes computing a combination of two model components: 1) A set of sparse mixture weights 610 for automatic determination of the number of patterns; and 2) a set of individual sparse GGMs 620 such as labeled GGM 1, GGM 2, . . . , GGM K. The former 610 can be different from asset to asset, and thus represents individuality of the assets in the fleet. The latter 620 is shared with the asset and thus represents a commonality across assets. The individually sparse mixture weights 610 for an asset specify the importance of the GGMs 620. That is, computed sparse mixture weights 610 function as a selector of the GGMs in the set of sparse graphs 620 and different systems 605 have different weights or signature weight distributions. These weights will have many zeros for robustness and interpretability and are automatically learned from the received sensor data.

The resulting prediction model 650 for the asset is as follows:

$$px = \Sigma_{k=1}^{K} \pi_k \mathcal{N}(x|\mu_k,(\Lambda^k)^{-1})$$

where $\Lambda^k$ is a sparse Gaussian graphical model and k is a component Gaussian density.

Figure 7:
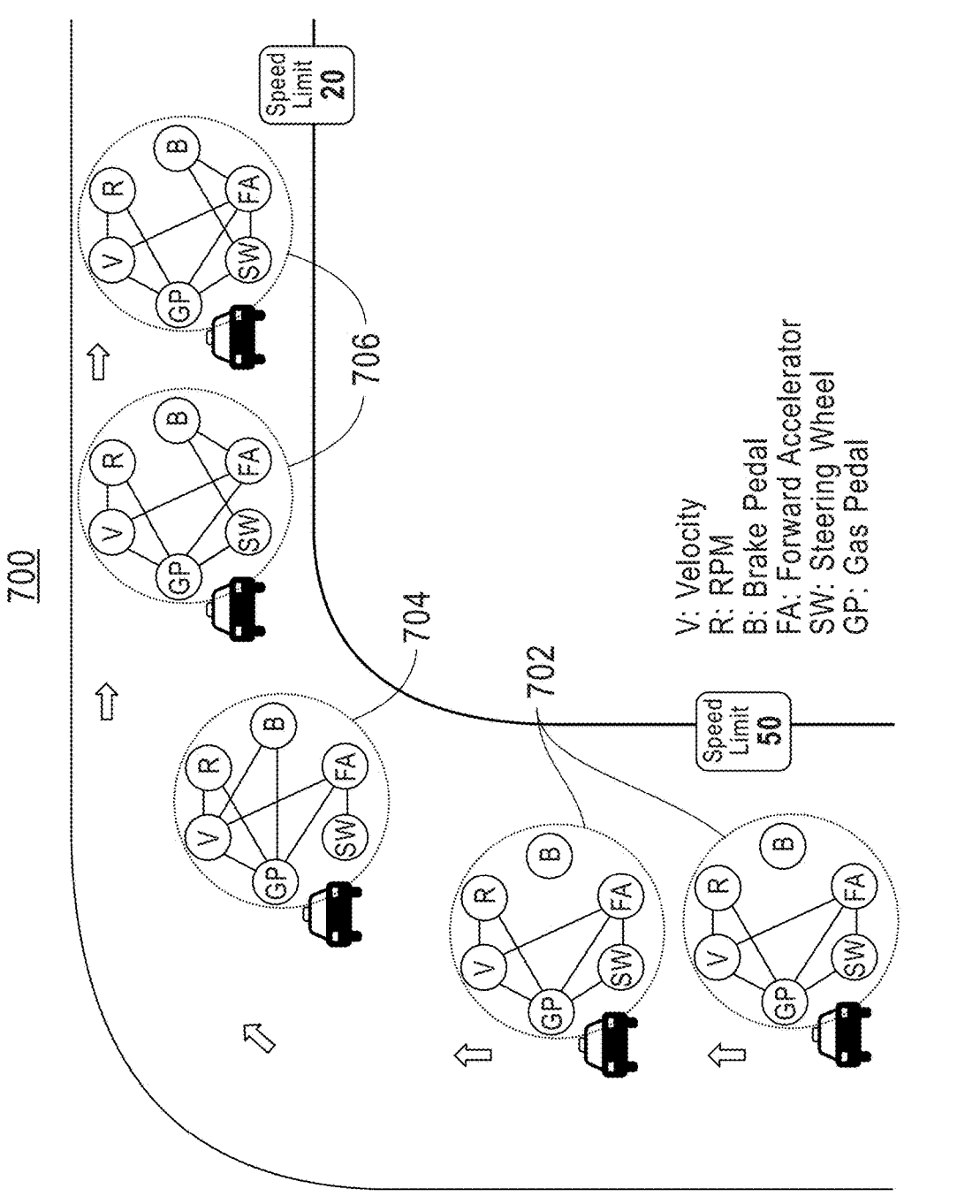
FIG. 7 conceptually depicts a plurality of dependency graphs for different operation modes over time, in particular, the network behaviors for sensors in a moving vehicle.

FIG. 7 conceptually depicts a plurality of dependency graphs for different operation modes 700 over time, in particular, the network behaviors for sensors in a moving vehicle, e.g., where the vehicle is approaching and making a turn. FIG. 7, in particular, shows, over a period of time, the changing of the dependency graphs 702, 704, 706 modeling the changing behavior of the vehicle as reported by sensors for the moving vehicle including velocity (V), engine RPM (R), brake pedal (B), forward accelerator (FA), steering wheel (SW) and gas pedal (GP). Each vehicle can have a build learned prediction model generated according to a weighted combination of different GMMs corresponding to the asset's respective modes of operation over a time sequence.

Figure 8:
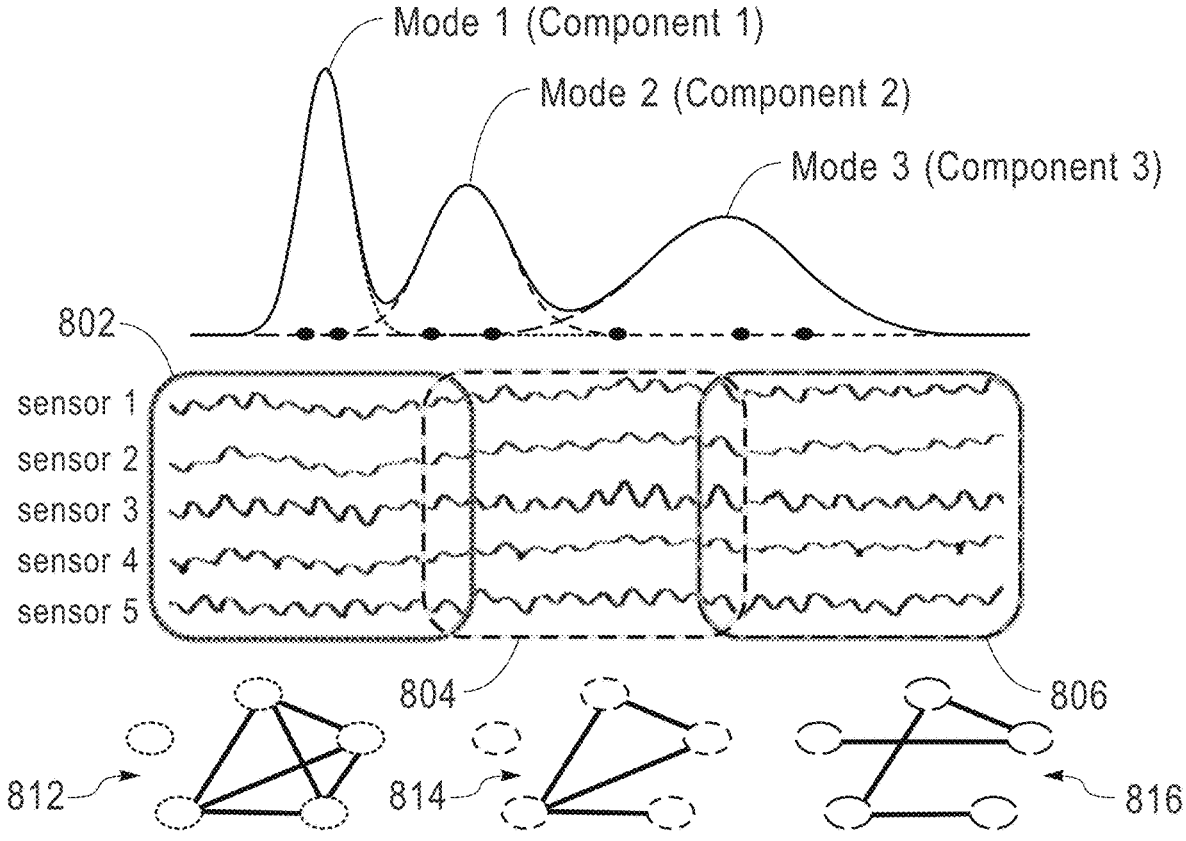
FIG. 8 depicts aspects of a temporal-coupling multi-modal mixture model or Mode Fidelity Mixture Model (MFM) in accordance with an embodiment.

FIG. 8 depicts aspects of a temporal-coupling multimodal mixture model or Mode Fidelity Mixture Model (MFM) in accordance with an embodiment. In FIG. 8, as in FIG. 7, the asset can be operated in different modes, and a data-driven model can use a very few number of sample points to construct a wrong mode. Thus, new conditions are introduced when a mode is established (detected), i.e., to establish a mode, given conditions of "sufficient sample data" and "maximizing loglikelihood". In FIG. 8, the line 800 denotes a Gaussian mixture model (GMM) which is composed of a weighted sum of three components (Components 1-3) denoted with dashed lines. However, in FIG. 8, these three components correspond to multivariate data 802, 804, 806 composed of the same set of variables during different (possibly at least partially overlapping) windows of time. Thus, the corresponding Gaussian graphical model (GGM) representations 812, 814, 816 of the three components of the GMM (an MFM) each have the same set of nodes (e.g., the set of sensors), with the only difference being the connections between the nodes.

Conventionally, to detect a mode of a multi-modal system, a log-likelihood function is used. The log likelihood is used to generate the GMM mixture model. When using a GGM, to detect a mode, the log-likelihood is maximized according to:

$$\max_{\pi,\mu,\Sigma} \sum_{k=1}^{K} \log \mathcal{L}_p(\theta) = \sum_{n=1}^{N} \log\left(\sum_{k=1}^{K} \pi_k \mathcal{N}\left(x_n \mid \mu_k, \sum_k\right)\right)$$

The mixture weights are updated where irk are sparse mixture weights:

$$\max_{\pi} \sum_{k=1}^{K} r_k \ln \pi_k$$

$$\text{subject to } \sum_{k=1}^{K} \pi_k = 1$$

The covariances are updated:

$$\sum_k = \frac{1}{N_k} \sum_{n=1}^{N} r_{nk}(x_n - \mu_k)(x_n - \mu_k)^T$$

Or by solving the graphical lasso model $\Sigma_k = (X)^{-1}$:

$$\min_{X>0} tr(SX) - \log\det(X) + \lambda\|x\|_1$$

However, these techniques do not employ structured learning (e.g., sparsity and/or correlation). Irrelevant components can be removed by a sparse model. The sparse model may include sparse mixture weights irk and a sparse inverse covariance $\Sigma_k^{-1}$. The sparse mixture weights irk may provide an automatic determination of the number of patterns, while the sparse inverse covariance $\Sigma_k^{-1}$ and/or inverse precision matrix $(\Lambda^k)^{-1}$ may provide a sparse Guassian graphical model (GGM). Thus, the resulting model may be a multi-layer sparse mixture of sparse GGMs, which may include both sparsity in the dependency structure of the GGM and sparsity over the mixture components.

FIG. 9 is a diagram illustrating an exemplary methodology 900 for building a Mode Fidelity Mixture Model (MFM), i.e., building the multi-modal prediction model for an asset in accordance with an embodiment. When running the algorithm 900, a condition to form a mode, is to impose a condition 912 that there is sufficient enough data to support the mode, i.e., a requirement to impose a minimum number of samples for each component k. In an embodiment, a hyperparameter $\ell$ specifies an imposed threshold for the number of samples.

Once trained, the predictive MFM model 650 can be used to proactively detect anomalies for assets, e.g., during an actual process, using real-time or near real-time multivariate time series sensor readings. The MFM model 650 built according to the procedures of FIG. 9 can further be used for tool matching, e.g., chamber matching, in complex (semiconductor) manufacturing and development operations. The MFM model 650 built according to the procedures of FIG. 9 can further be used for aberrant product diagnosis in complex manufacturing operations (e.g., product aberration root cause diagnosis for semiconductor manufacturing and development).

In the MFM methodology 900 of FIG. 9, the procedure receives input parameters $\lambda$, $\beta$ and $\ell$ that are to be tuned. The $\lambda$ parameter is used to control the mixture weight sparsity $\pi^s$ and the $\beta$ is used to control the sparsity for precision (inverse covariance) matrix $\Sigma_k^{-1}$. The parameter $\ell$ represents the lower bound on the number of samples for each mode. This parameter enforces a lower bound for the number of sample points to form a new operational mode for an asset.

At 902, the MFM method initializes the gaussian model component including the mean $\mu_k$ and the covariance $\Sigma_k$ by the k-Mean algorithm. Further the mixing coefficient $\pi_k$ is initialized as a value $$\frac{1}{K}$$

for all K. Tnen, in an iterative process 905 until a convergence criteria is met, there are performed steps 915 to update the weighted mean $\mu_k$ and weighted sample covariance $\widetilde{S_k}$. At step 912 there is assigned a weight value $r_k^n$ representing the responsibility of the k-th mixture component for the n-th data point. In an embodiment, at 912, the $r_k^n$ is assigned a value computed according to equation (1) as follows:

$$\max_{r_{nk}} \sum_{n,k} C_{nk} r_{nk} \tag{1}$$

and is subject to the following constraints:

$$r_{nk} - \epsilon \le y_{nk}, \forall n=1, \ldots, N, k=1, \ldots, K$$

$$r_{nk} - \epsilon y_{nk}, \forall n=1, \ldots, N, k=1, \ldots, K$$

$$\Sigma_{k=1}^K r_{nk} = 1, \forall n=1, \ldots, N$$

$$\ell \le \Sigma_{n=1}^N y_{nk}, \forall k=1, \ldots, K$$

$$y_{nk} \in \{0,1\}, \forall n=1, \ldots, N, k=1, \ldots, K.$$

where $C_{nk} = \pi_k \log p(x_n|\mu_k, \Sigma_k)$

In an embodiment, the method only looks at the cluster k: $\pi_k > \epsilon$. Value $\ell$ is the respective lower bound for each mode. The minimum sample (lower bound) is a parameter threshold to set forth the minimum number of samples to establish a mode.

After performing the sample weight update at 912, the For loop is entered at 915 to assign and update $N_k$, weighted mean $\mu_k$ and weighted sample covariance $\widetilde{S_k}$ values for $k \leftarrow 1, \ldots, K$. These values are used to update mixture weight $\pi$ and the covariance $\Sigma_k$.

Upon exiting For loop, at 920, the sparse mixing weight (coefficient) value $\pi$ is updated and the GGM covariance parameter $\Sigma_k$ is updated. The mixing weight value $\pi$ is updated using the SWSA method such as described in commonly-owned, co-pending U.S. Patent Publication No. 2021/0117836 the whole contents and disclosure of which is incorporated by reference. The SWSA method implemented at 920 uses both the updated $r_k^n$ value representing the responsibility of the k-th mixture component for the n-th data point and the $\lambda$ parameter used to control the mixture weight sparsity. The inverse covariance $\Sigma_k$ is updated using a sparse GGM (gaussian graphical model) method SGGMM $(\hat{S}^k, \beta))$ at 921 using the $\widetilde{S_k}$ values and the $\beta$ parameter used to control the sparsity for the precision matrix (e.g., the maximum number of non-zero entries in the precision matrix). SGGM solves the following problem $$\sum_k \leftarrow \underset{X>0}{\text{argmin}}\ tr\left(\hat{S}^k X\right) - \text{logdet}(X)$$

$$\text{s.t. } \|X\|_0 \le \beta.$$

Finally, at 925, FIG. 9, the mixture weight irk, mean $\pi_k$ and covariance $\Sigma_k$ values are returned.

To learn the modal mixture model 900 of FIG. 9, prediction model hyperparameters $\lambda$, $\beta$ and $\ell$ need to be determined. In an embodiment, for model parameter selection for the MFM, the Bayesian Information Criterion (BIC) and the Akaike Information Criterion (AIC) are used. The three parameters needed to be tuned include the aforementioned $\Delta$ parameter used to control the mixture weight sparsity $\pi^s$, the $\beta$ parameter used to control the sparsity for precision (inverse covariance) matrix $\Sigma_k^{-1}$ and the $\ell$ parameter representing the lower bound on the number of samples for each mode.

To learn the parameters, the log-likelihood is defined as:

$$L(x|=\pi,\mu,\Sigma)=\log \mathcal{L}_p(\theta)\Sigma_{s=1}{}^S\Sigma_{n=1}{}^N \log(\Sigma_{k=1}{}^K \pi_k{}^s \mathcal{N}(x_n|\mu_k,\Sigma_k))$$

A formulation for determining the model parameters, the BIC has the form:

$$\text{BIC}(\lambda,\beta,\ell = 2*L(x|\pi,\mu,\Sigma) - \log(N)*d$$

where d is the model complexity, i.e., the number of parameters to be estimated in the MFM. In an embodiment, the model complexity is a summation of the number of non-zero weights in the sparsified inverse covariance matrices and the number of non-zero weights in the mixture models.

The AIC has the form:

$$AIC(\lambda,\beta,\ell = 2*L(x|\pi,\mu,\Sigma)-2d.$$

The optimization problem is to search for $\lambda$, $\beta$, $\ell$ so that BIC($\lambda$, $\beta\ell$) and AIC($\lambda$, $\beta$, $\ell$) is maximized. In an embodiment, the BIC and AIC computations can be run iteratively with different combinations of values of $\lambda$, $\beta$, $\ell$ to determine which maximize the BIC and AIC. In an embodiment, the BIC and AIC can be optimized by grid search method or Baysian optimization.

In a further embodiment, for the model parameter selection for the MFM, a further complexity estimation method 950 for determining model complexity d is provided as shown in FIG. 10. This prediction learning model guarantees to return a sparsity model in terms of the number of components, i.e., the mixture weight $\pi_k$ is $\epsilon$-sparse. That is, for a given small $\epsilon > 0$, a vector x is called an $\epsilon$-sparse solution if many elements satisfy $|x_i| \le \epsilon$. The method denotes $\|x\|_\epsilon$ by the $\epsilon$-norm, counting the number of entries $|x_i| > \epsilon$.

In the complexity estimation methodology 950 of FIG. 10, a first step 952 initializes model complexity d as 0. Then, an outer For loop 960 is entered for iterating through index k=1, . . . , K, to first determine at 962 whether any mixture weight sparsity $\pi_k{}^s$ value is greater than the sparsity value $\epsilon$. If $\pi_k{}^s \ge \epsilon$ for any s where s is an index, then model complexity d is computed at 965 as follows:

$$d \leftarrow d + (nnz(\mu_k)) + \frac{nnz\left(\sum_k\right) - M}{2} + M$$

where nnz counts the number of nonzero parameters.

Then, an outer For loop 980 is entered for iterating through index k=1, . . . , K, where at each iteration of k, an inner For loop 970 is entered for iterating through index s=1, . . . , S where a further determination is made at 972 whether any mixture weight sparsity $\pi_k{}^s$ value is greater than the sparsity value $\epsilon$. If $\pi_k{}^s \ge \epsilon$, then model complexity d is computed at 975 as follows:

$$d \leftarrow d+1$$

Once iterating through the k and s, the complexity estimation method 950 returns the computed model complexity value d. Based on the computed model complexity value d, the parameter values $\lambda$, $\beta$, $\ell$ are determined that maximize the BIC or AIC optimizations. These values $\lambda$, $\beta$, $\ell$ are then returned for use in the MFM model build method steps 912, 920, 921 of FIG. 9 when determining the mode(s). The MFM method 900 is then run to update determine the mixture weight $\pi_k$, mean $\mu_k$ and covariance $\Sigma_k$ values (of component k) and the optimization problems BIC and AIC are run again with these values to search these $\lambda$, $\beta$, $\ell$ parameters that maximize BIC and AIC functions.

Figure 11:
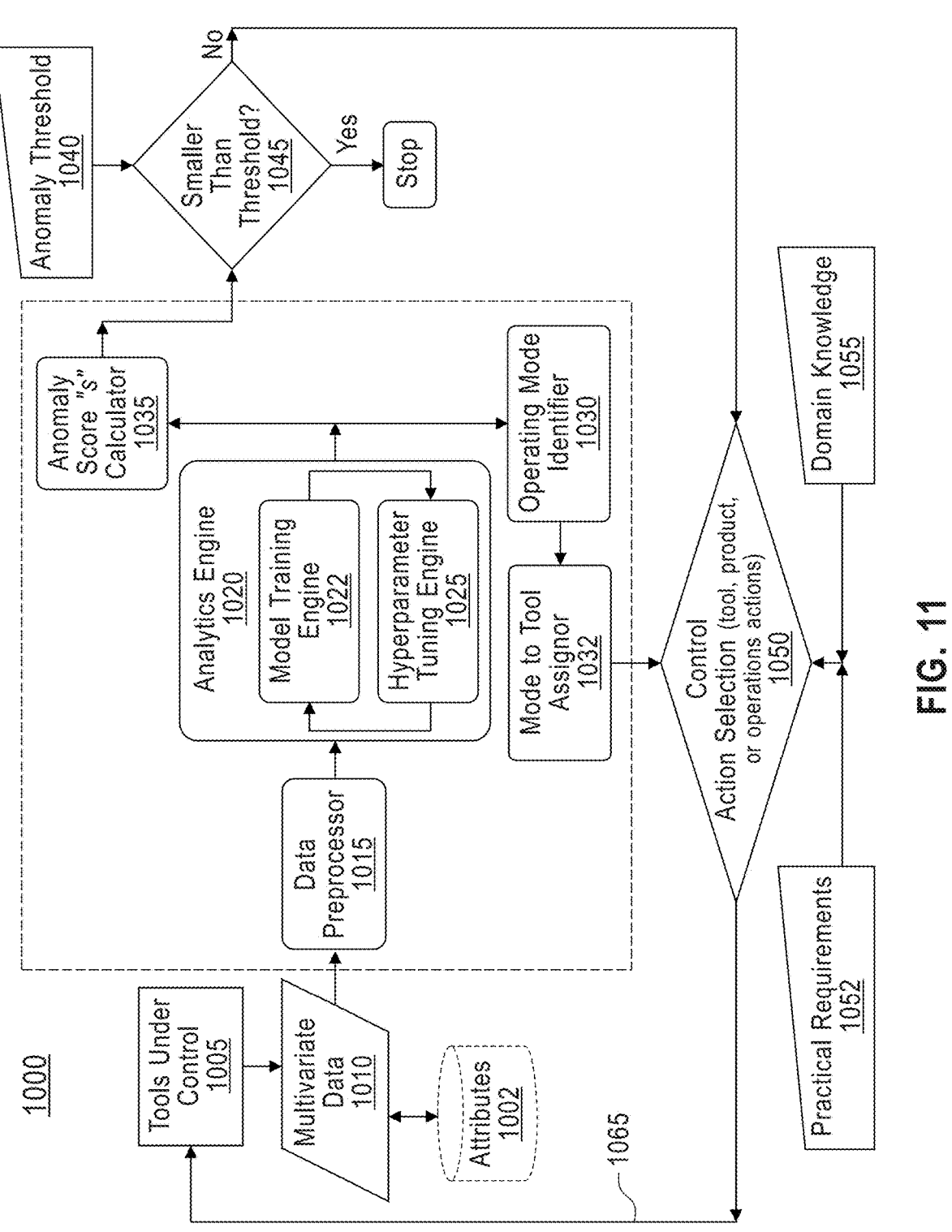
FIG. 11 depicts an example system including components for observing the current state of an asset, the learning of the predictive model, and the taking of control actions to change asset characteristics in an embodiment.

FIG. 11 depicts a system 1000 including components implementing methods and functions to observe the current state of an asset, including the learning of the predictive model, and the taking of control actions to change its characteristics.

In one aspect, the system 1000 of FIG. 11 implement the methods herein that assist in learning a predictive multi-modal mixture model that can automatically learn different operating modes (density functions) for any multi-modal system. In the system 1000, an attributes database 1002 provides stored historical multivariate data such as the time series sensor measurement data obtained from an asset, e.g., a tool or system, including non-stationary assets.

For example, as described in conjunction with the description of FIG. 6 above, these time series sensor measurements can be acquired from the automated fabrication tool performing the semiconductor manufacturing process and stored in an attributes database (DB) 1002.

Alternately, in an embodiment, during a real-time operation, a tool 1005 can generate the multivariate data 1010 in real-time and the data can be analyzed for use in controlling the tool 1005. In either scenario, by analyzing obtained multivariate data obtained from the processing of a semiconductor wafer, the built/trained predictive model can be implemented to make remedial action recommendations that can be implemented to control a tool so as to improve the quality and yield of subsequent wafers.

In embodiments, historical multi sensor time series data from a fleet of assets is obtained. In an example case of cohort analysis for semiconductors, a fleet of assets can be hundreds of similar types of tools or "assets" operating under different operating conditions used in the manufacturing of semiconductor wafers in a semiconductor manufacturing facility. For exemplary purposes, such received historical multi sensor time series data can include but is not limited to: Historical data characterizing incoming wafers, chamber condition or behavior (e.g., process trace data) or chamber performance (e.g., deposition or etch rates).

In FIG. 11, in an embodiment, a data preprocessor 1015 can be implemented to filter, label, compress, or otherwise prepare the multivariate data for use in predictive model training and analysis. As a non-limiting example, data processor 1015 receives input data from the semiconductor manufacturing process. According to an exemplary embodiment, the input data is multi-dimensional and consists of time series sensor measurements made at each step of the semiconductor manufacturing process. For instance, the input can include timestamped voltage, current and/or pressure sensor data collected during the different steps of the semiconductor manufacturing process. According to an exemplary embodiment, data preprocessor can process historical input data using simple statistics (e.g., mean, median and standard deviation for each feature), perform PCA (principle component analysis) for each feature, or a GRP (generalized radix permutation) for each feature, an autoencoder for each feature and combinations thereof, to produce a compressed data representation of the input data. The preprocessing of historical multi-variate data can include feature exclusion and scaling.

An analytics engine component 1020 provides the infrastructure methods and routines implementing the model training engine 1022 to generate the multi-modal predictive model p (x) used for learning density functions for an asset or cohort of assets using graphical mixture models. In one embodiment, the method 900 depicted in FIG. 9 and the method 950 depicted in FIG. 10 are run to generate and use the prediction function p(x) characterizing the asset. Such a predictive function p(x) can be used to determine if there are any outliers in a system tool's/asset's behavior or identify a new mode of operation. The analytics engine component 1020 further includes a hyperparameter tuning engine 1025 for learning other hyperparameters that are not learned from the data. That is, while the parameters $\pi$, $\mu$, $\Sigma$ of the model are learned from the data, the following hyperparameters obtained from hyperparameter tuning engine 1025 that are not learned from the data include: a hyperparameter specifying the maximum number of component models to be used; a hyperparameter specifying a numeric penalty term that is used to drive the sparsity of the overall model (minimizing the number of component models actually used); and a further hyperparameter specifying a numeric penalty term that is used to drive the sparsity of the individual component models (minimizing the number of nodes in the component models).

When used for an application to determine a mode of operation, in an embodiment, as shown in FIG. 11, analytics engine 1020 receives the processed multivariate time series sensor measurements data and uses this data to automatically generate a graphical mixture model for use in predicting occurrence of a new operating mode of the tool or asset at 1030. In an embodiment, for a sample x, the corresponding mode is determined by:

$$\text{argmax}\{k{:}\ln(\pi_k \mathcal{N}(x|\mu_k,\Sigma_k))\}.$$

A mode to tool assignment component 1032 is invoked to assign a new identified mode operation to the tool. Based on determining a new mode of operation (e.g., a new mode assignment), a determination is made at 1050 as to whether any control action needs to be taken, a control action referring to any action to modify a tool/asset, a product or an operation. Such a determination at 1050 can take into account any obtained practical requirements 1052 for the tool and/or process or make use of domain knowledge 1055 including obtaining any ability, understanding or additional information that applies to a specific topic, e.g., knowledge of an expert in a specific industry, discipline or activity. Thus, based on this identified mode of operation a control action 1065 can be determined at 1050 which control action 1065 can include performing a maintenance or operations update a product hold, or changing of a process performed by the tool 1005 or changing the tool's characteristics as practical requirements and/or domain knowledge may suggest.

Otherwise, in an alternate embodiment, when predictive function p(x) is used to determine if there are any outliers in a system tool's behavior, an anomaly score calculator component 1035 of system 1000 is invoked to generate an anomaly score for a GMM which is a numerical value representing the degree of anomalousness of the operational state. For example, given a (set of) new sample(s) observed in an arbitrary task, (e.g., a new multivariate data input), using the log likelihood determine if a new sample operation is exhibiting anomalous behavior. An anomaly score is computed by using the learned probability density function p(x) according to:

$$s = -\ln p(x)$$

where x is a new sample of the asset. Then, at 1045, the generated anomaly score s is compared against an anomaly threshold 1040 which can represent a normal state of operation, and if the current computed anomaly score s is less than the anomaly threshold, the method stops as the output from that step is considered regular, i.e., non-anomalous, and no remedial action is needed. As an example, a current health condition of the tool/asset is determined by the quality of the latest wafer output and the anomaly score can be computed for the wafer. If the score is low (less than a pre-specified threshold), then it determined that the tool is healthy. Otherwise, if at 1045, it is determined that the current computed anomaly score s exceeds the anomaly threshold, then this indicates the process is not proceeding regularly or exhibits anomalous behavior and remedial action is recommended to correct the anomalies. Consequently, the process then proceeds to 1050 to determine whether any control action is needed in view of detected anomaly in which step 1065 may be performed upon the tool under control 1005 based on any practical requirements or specific domain knowledge. For example, based on the tool specifications, it may not be practical to recommend remedial actions involving, e.g., voltage, current and/or pressure, adjustments outside the range of the tool. Further, in step 1055, engineering domain knowledge can be obtained and used in determining what remedial actions to recommend. For instance, engineers can recommend certain remedial actions to correct the anomalies and/or what actions are likely to have no effect or a negative effect. By way of example only, users can input such domain knowledge into the system via the user visible interface described above and/or via any other suitable user interface.

The remedial recommendations are then used to implement changes to the multi-step semiconductor manufacturing process. For instance, in step 1065 the remedial actions are implemented in the tool under control to improve the quality and yield of subsequent wafers. For example, the voltage, current and/or pressure can be altered in the tool in one or more of the steps for which anomalies were detected. Advantageously, these remedial actions can be implemented in the tool under control in an automated manner whereby the voltage, current and/or pressure parameters of the tool can be automatically adjusted for each step reporting an anomaly based on the feedback from the present anomaly detection process. For instance, the tool under control can perform each step in a separate processing chamber. Thus, by way of the present techniques, the voltage, current, pressure, position, flow, power, temperature, state, speed, time, duration, bias, frequency, setpoint, count, velocity, intensity, phase, cycle, in-use time, in-use cycles and/or impedance parameters of the corresponding processing chamber(s) can be automatically adjusted based on the remedial action recommendations.

Figure 12:
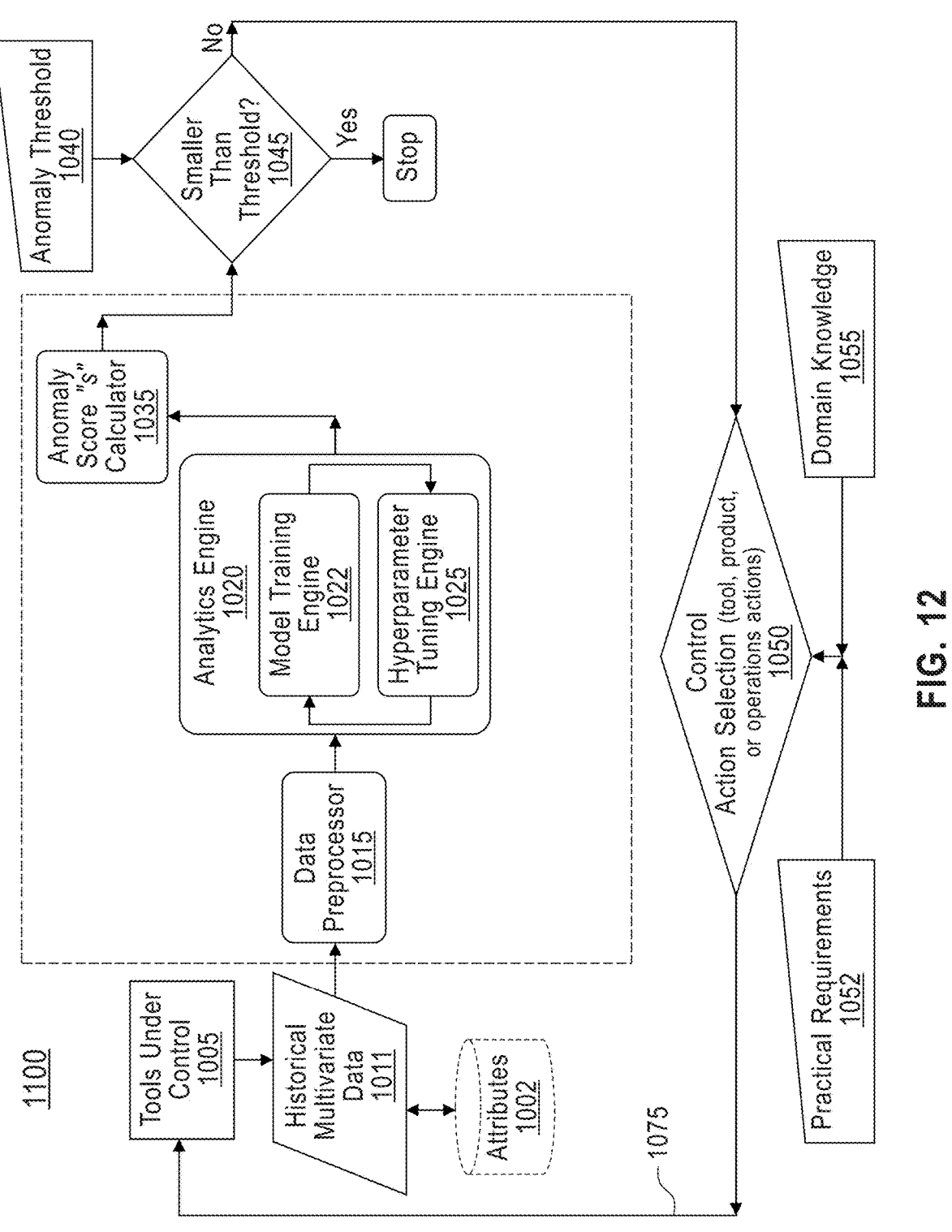
FIG. 12 shows an example system corresponding to the system of FIG. 11 that is configured to perform reactive anomaly detection in an embodiment.

In an embodiment, as shown in FIG. 12, a system 1100 corresponding to system 1000 of FIG. 11 can be configured to perform reactive anomaly detection where, for example, given stored historical multivariate data, the system 1000 can determine if there are any outliers in one or more tools' behavior by assessing each point in the history to see if it is anomalous. The system 1100 of FIG. 12 corresponds exactly to the system 1000 of FIG. 11 however, does not require components 1030, 1032 for determining of operating modes of tool/asset behavior. Rather, system 1100 uses only stored historical multivariate data 1011 for generating the prediction model p(x) and computing the anomaly score s based on the new data sample. Based on a comparison performed at 1045 of the score s against the anomaly threshold 1040, if it is determined that the computed anomaly score s exceeds the anomaly threshold 1040, the process proceeds to step 1050 to determine whether any control action is needed in view of detected anomaly. If anomalous behavior is detected, a control action can be selected at 1050 based on any practical requirements or specific domain knowledge. Such selected control action can include, at step 1075, examining wafers that were processed during aberrant behavior, or investigating tool behavior in more detail.

In an embodiment, for reactive mode detection for the historical data, the operating modes of the system correspond to dependency matrices $\Sigma_k$, where the mixture weight $\pi_k \geq \epsilon$, where E is defined in the method 950 of FIG. 10.

Figure 13:
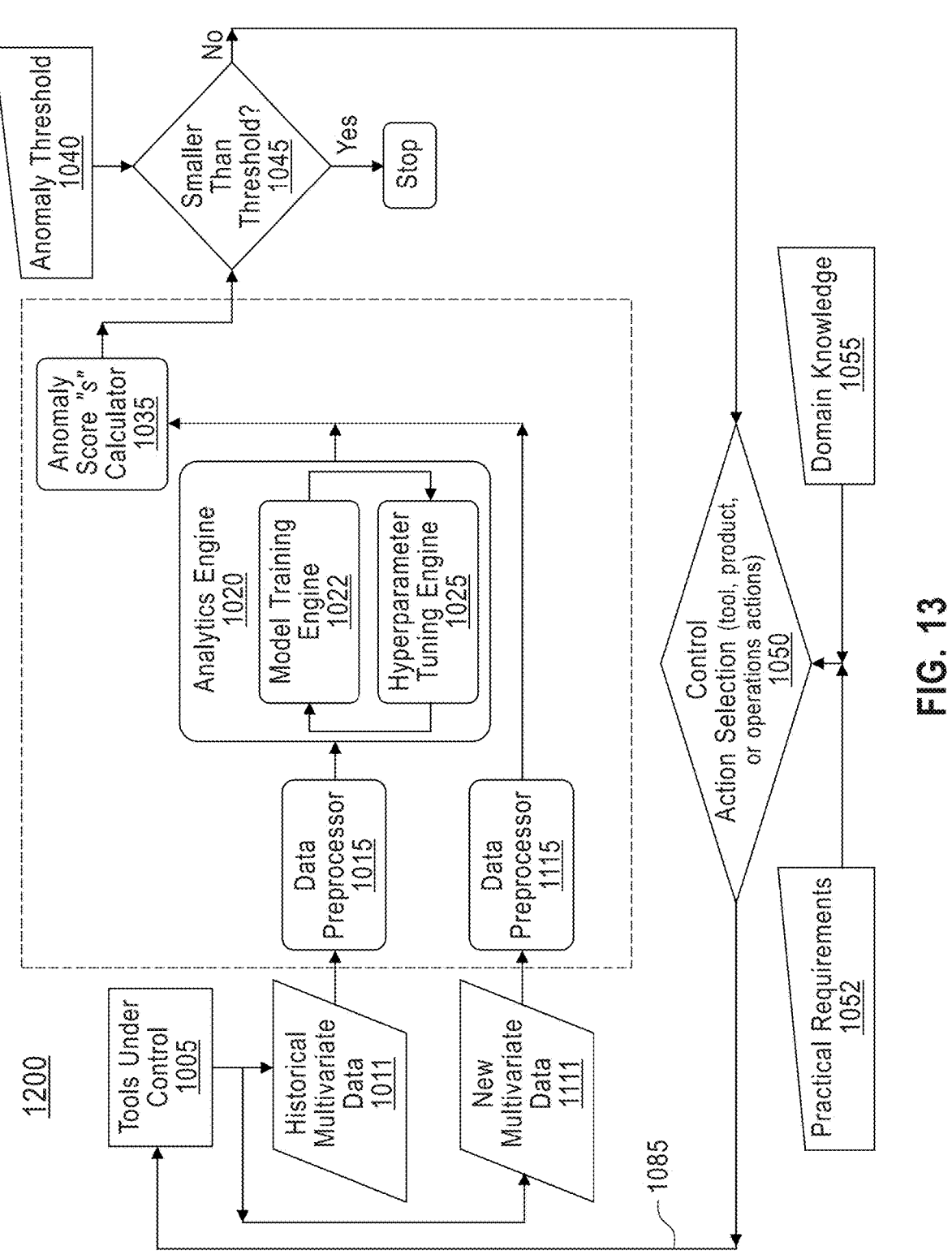
FIG. 13 shows an example system corresponding to the system of FIG. 11 that is configured to perform proactive monitoring in an embodiment.

In an embodiment, as shown in FIG. 13, a system 1200 corresponding to system 1000 of FIG. 11 can be configured to perform proactive monitoring where, for example, given stored historical multivariate data, the system 1200 builds a predictive model of a tools' behaviors and, as new data (new sample values) is collected, assesses each new data point $x_{new}$ to see if it is anomalous. The system 1200 of FIG. 13 does not require components 1030, 1032 for determining of operating modes of tool/asset behavior. Rather, system 1200 uses only stored historical multivariate data 1011 for training the model parameters $\pi_k$, $\mu_k$, $\Sigma_k$ of the prediction model p(x). However, the prediction model is not updated with the new data $x_{new}$. Rather, as a new data $x_{new}$ is collected, the anomaly score calculator uses the trained values $\pi_k$, $\mu_k$, $\Sigma_k$ and the values of $x_{new}$ to compute the anomaly score for $x_{new}$ as follows:

$$s = -\ln\left(\sum_{k=1}^{K}\pi_k N\left(x_{new} \mid \mu_k, \sum_k\right)\right)$$

This newly computed anomaly score for $x_{new}$ is then compared against the anomaly threshold at 1045 and based on the comparison of the new score s against the anomaly threshold 1040, if it is determined that the computed anomaly score s exceeds the anomaly threshold 1040, the process proceeds to step 1050 to determine whether any control action is needed in view of detected anomaly. If anomalous behavior is detected, a control action can be selected at 1050 based on any practical requirements or specific domain knowledge. Such selected control action can include, at step 1085, investigating further the importance of the anomaly on the product and/or identifying and remediating any root cause of the anomaly in tool behavior.

Figure 14:
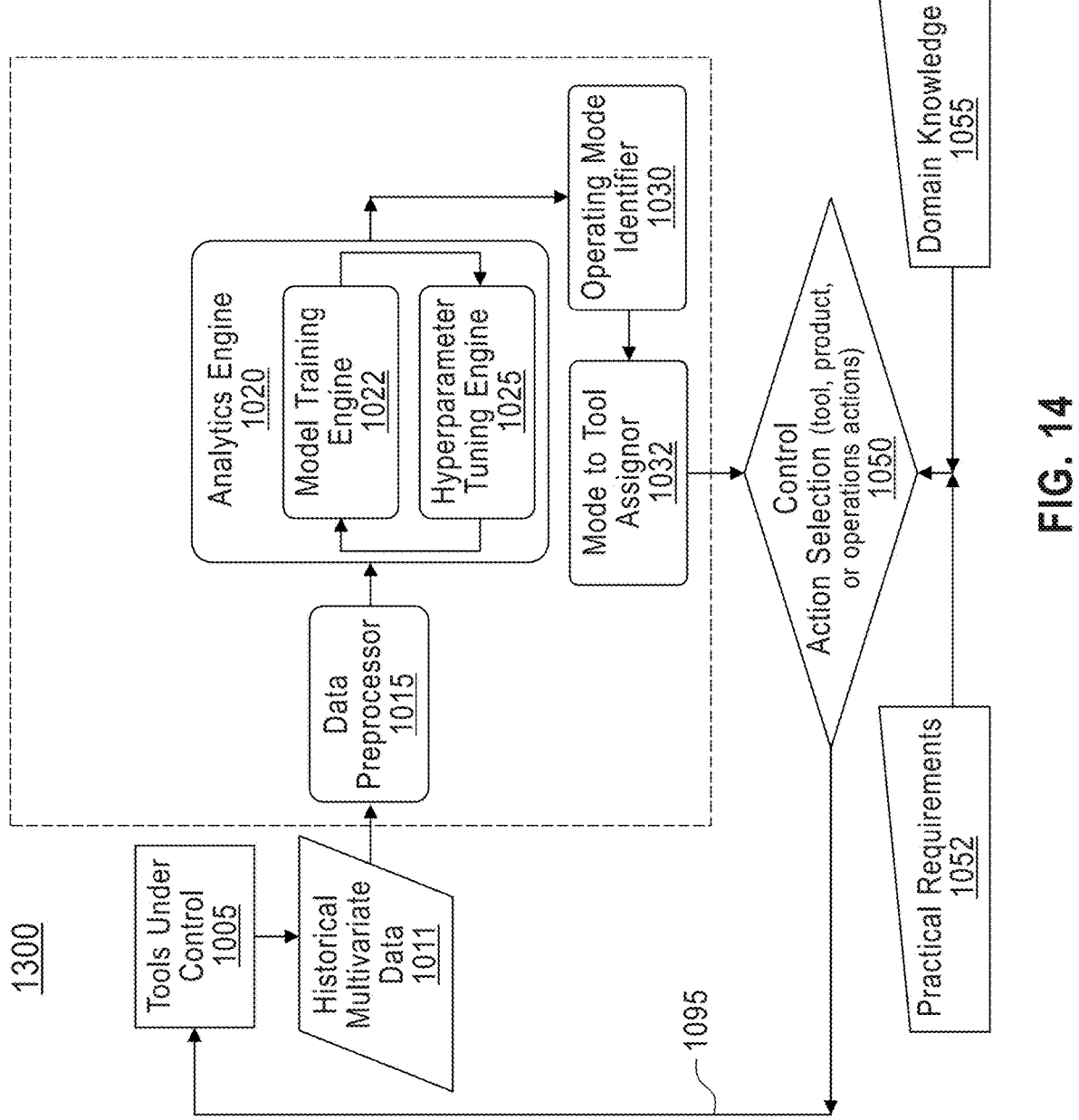
FIG. 14 shows an example system corresponding to the system of FIG. 11 that is configured to perform a tool matching application in an embodiment.

In an embodiment, as shown in FIG. 14, a system 1300 corresponding to system 1000 of FIG. 11 can be configured to perform a tool matching application where, for example, given stored historical multivariate data, the system 1200 identifies the modes of a tools' operations and assigns modes of operation to each tool or assigns mode of operation to a tool over a time period, e.g., an associated time period of when said asset operated in said new operating mode. Each tool may have one mode, but one or more tools may exhibit multiple modes of behavior over time. All nominally identical tools, conducting nominally identical operations, should behave identically.

As an example, an objective of a tool matching application is to discover groups of assets and asset cohorts behaving in similar fashions, or time periods during which assets exhibit similar behaviors; and to characterize common modes of asset behavior. In a non-limiting example application, cohort analysis is conducted for analyzing assets of a semiconductor manufacturing facility, e.g., the building of wafers having read-only-memory (ROM). Such an analysis can be used for chamber matching, e.g., to assess whether a deposition chamber or etch chamber is well matched to the remainder of the fleet and discover modes of behaviors associated with a chamber and the remainder of the fleet.

The system 1300 of FIG. 14 corresponds exactly to the system 1000 of FIG. 11 however, does not require anomaly score calculator component 1035 for computing anomalous behavior of a tool/asset. Rather, system 1300 uses stored historical multivariate data 1011 for generating the prediction model p (x) and uses the prediction model to identify an operating mode at 1030 and assigns that mode to the tool at 1032. Then, the process proceeds to step 1050 to determine whether any control action is needed in view of detected mode, should the mode be detected as new, for example. At 1050, a control action can be selected based on any practical requirements or specific domain knowledge. Such a selected control action can include, at step 1095, determining the reasons for different behaviors and adjusting the tools accordingly.

Figure 15:
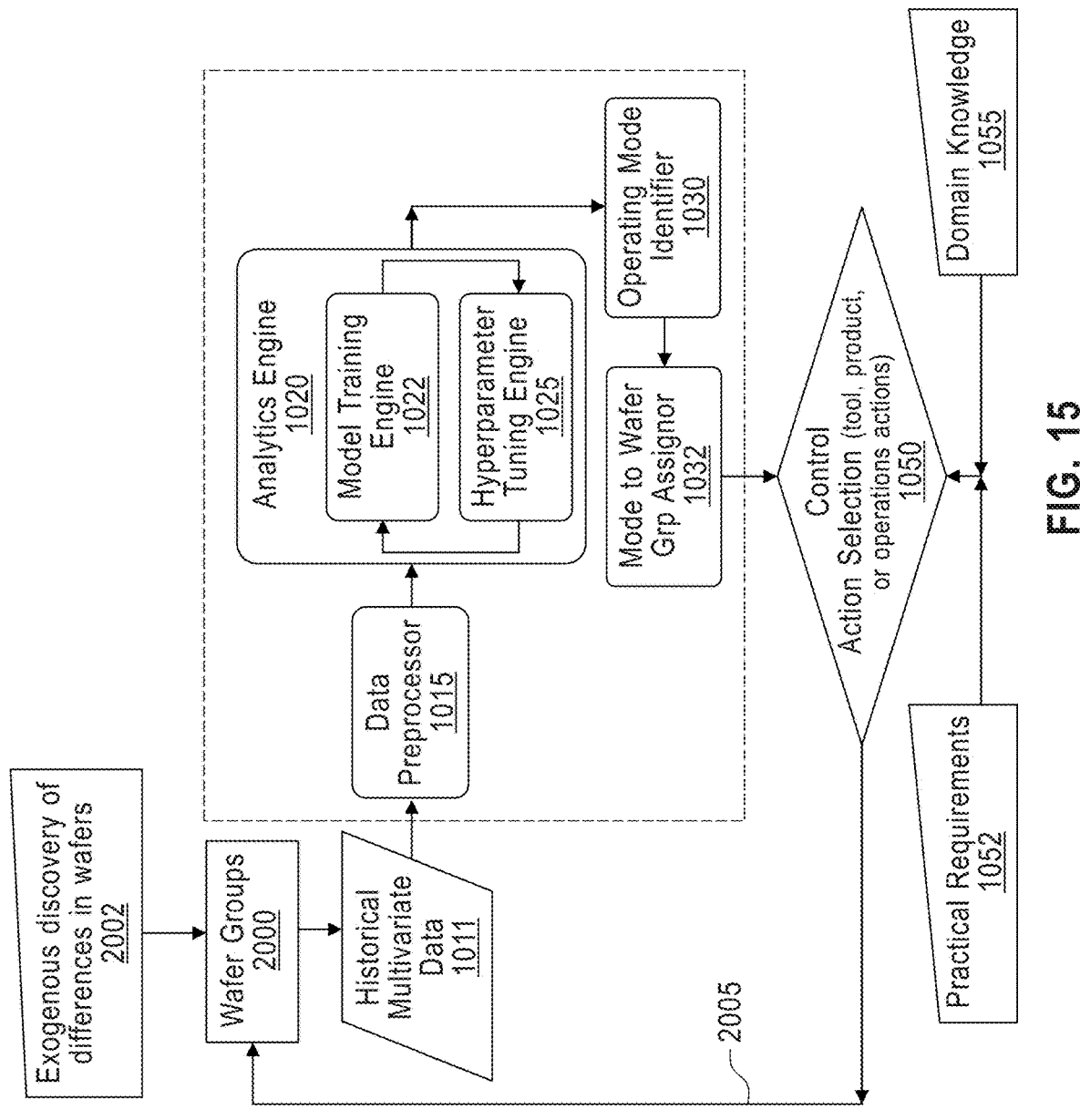
FIG. 15 shows an example system corresponding to the system of FIG. 11 that is configured to perform a product aberration root cause diagnosis in an embodiment.

In an embodiment, as shown in FIG. 15, a system 1400 corresponding to system 1000 of FIG. 11 can be configured to perform a product aberration root cause diagnosis where, for example, given groups of wafers discovered to be different, the system can use the multivariate data to provide an explanation in processing tools' behaviors (or in some other multivariate data characterizing the groups of wafers). For example, if there is a difference in two groups of wafers microprocessor speeds, it may be suspected that a certain process could be a root cause. Data from the associated processing tools producing the wafers could be gathered and used. However, data from measurements on the wafer can also be gathered, e.g., measurements of many dimensions. Measurements from those groups can be the input multivariate data. Then, the system 1400 can be used to assess behavior of tools (relationships in the multivariate data) for the good group and bad groups of wafers. In general, this analysis uses groups of observations that, up to now, have been associated with the tools, however, in this embodiment, the groups of observations are considered to be groups of wafers.

The system 1400 of FIG. 15 corresponds exactly to the system 1000 of FIG. 11 however, does not require anomaly score calculator component 1035 for computing anomalous behavior of a tool/asset. Additionally, the system 1400 considers wafer groups 2000 (rather than tools) and is configured to perform a root cause diagnosis upon an exogenous discovery at 2002 of differences in wafers, i.e., to discover potential root causes for differences between good and bad wafers and discover modes of behaviors associated with good and bad wafers, and/or identify and characterize optimal models. Rather, system 1400 uses stored historical multivariate data 1011 for generating the prediction model p(x) and uses the prediction model to identify an operating mode at 1030 and assigns that mode to the tool at 1032. Then, the process proceeds to step 1050 to determine whether any control action is needed in view of detected mode, should the mode be detected as new, for example. At 1050, a control action can be selected based on any practical requirements or specific domain knowledge. Such a selected control action can include, at step 2005, investigating further whether the difference in the tools' behavior could really be the root cause of differences in the wafers.

Each of the systems depicted in FIGS. 11-15, is configured to run analytical methods for the specific user application. In each analytical method, groups of observations are modeled by a sparse mixture of sparse models of modes of operation in which a sparse mixture encompasses relatively few component models; and sparse models encompass relatively few nodes in the component models. In this way, the overall model is relatively easy to interpret and is relatively insensitive to noise in the data. Some of the parameters of the model are learned from the data ($\pi$, $\mu$, $\Sigma$) while the aforementioned hyperparameters of the model are not learned from the data (e.g., the maximum number of component models to be used, the numeric penalty term that is used to minimize the number of component models actually used, and the numeric penalty term that is used to minimize the number of nodes in the component models.

Acceptable hyperparameter values and some figures of merit with which to evaluate how well the models work, can be based on a grid of potentially good values for these hyperparameters, computations of figures of merit that can be used to evaluate the models, or automatic search over the hyperparameter combinations and identification of the best hyperparameters to use for different figures of merit. Exactly which figure of merit is most important can be selected by the user in the context of the users' application.\

Figure 16:
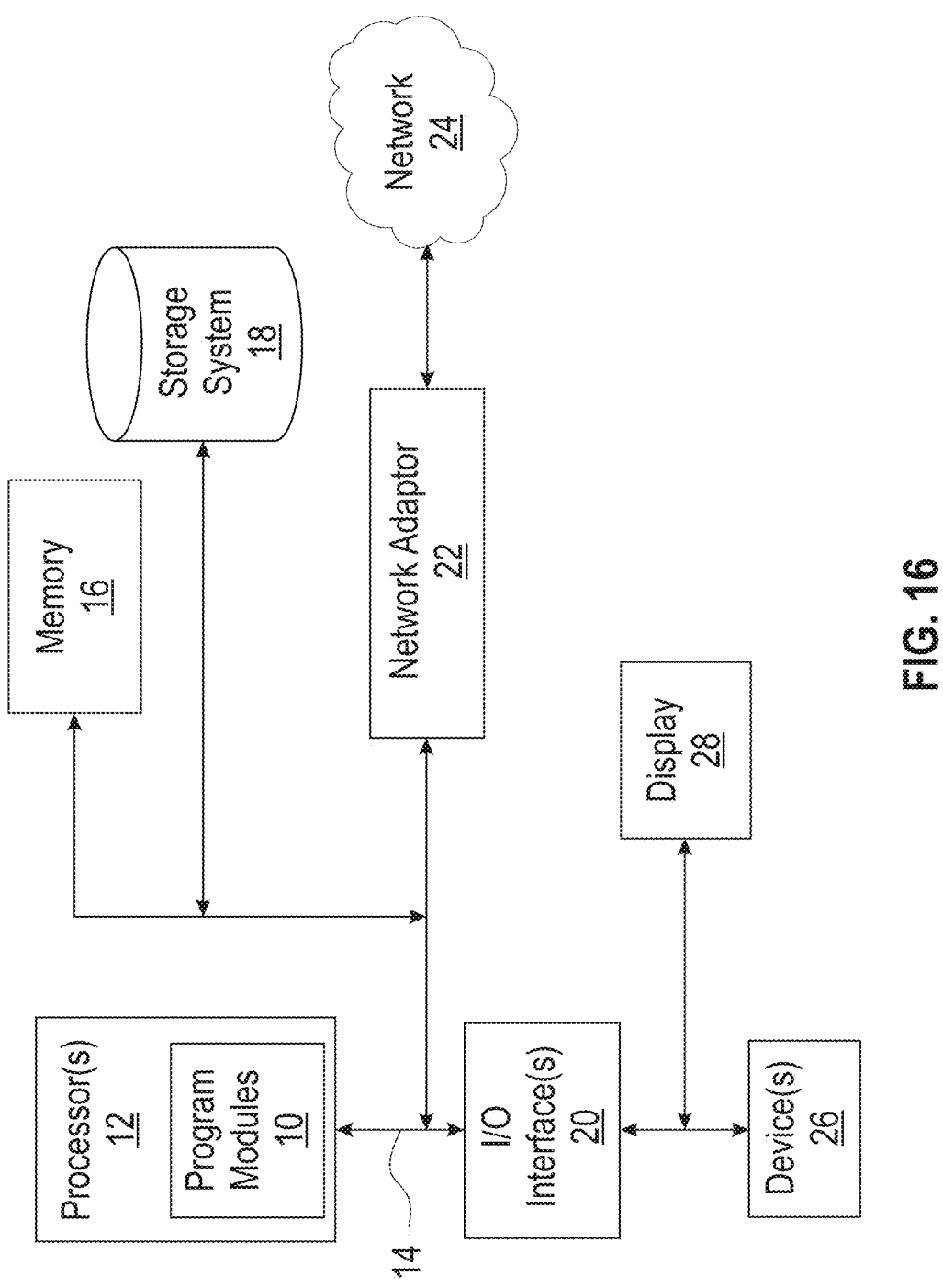
FIG. 16 illustrates an example computing system in which the present invention can be employed.

FIG. 16 illustrates an example computing system in accordance with the present invention that may provide the services and functions associated with a predictive model that can automatically learn different operating modes for a multi-modal system. It is to be understood that the computer system depicted is only one example of a suitable processing system and is not intended to suggest any limitation as to the scope of use or functionality of embodiments of the present invention. For example, the system shown may be operational with numerous other general-purpose or special-purpose computing system environments or configurations. Examples of well-known computing systems, environments, and/or configurations that may be suitable for use with the system shown in FIG. 16 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

In some embodiments, the computer system may be described in the general context of computer system executable instructions, embodied as program modules stored in memory 16, being executed by the computer system. Generally, program modules 10 may include routines, programs, objects, components, logic, data structures, and so on that perform particular tasks and/or implement particular input data and/or data types in accordance with the methods described herein.

The components of the computer system may include, but are not limited to, one or more processors or processing units 12, a memory 16, and a bus 14 that operably couples various system components, including memory 16 to processor 12. In some embodiments, the processor 12 may execute one or more modules 10 that are loaded from memory 16, where the program module(s) embody software (program instructions) that cause the processor to perform one or more method embodiments of the present invention. In some embodiments, module 10 may be programmed into the integrated circuits of the processor 12, loaded from memory 16, storage device 18, network 24 and/or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system may include a variety of computer system readable media. Such media may be any available media that is accessible by computer system, and it may include both volatile and non-volatile media, removable and non-removable media.

Memory 16 (sometimes referred to as system memory) can include computer readable media in the form of volatile memory, such as random access memory (RAM), cache memory and/or other forms. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

The computer system may also communicate with one or more external devices 26 such as a keyboard, a pointing device, a display 28, etc.; one or more devices that enable a user to interact with the computer system; and/or any devices (e.g., network card, modem, etc.) that enable the computer system to communicate with one or more other computing devices. Such communication can occur via Input/Output (I/O) interfaces 20.

Still yet, the computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with the computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for evaluating a state of an asset, the method comprising:

receiving, at one or more hardware processors, plural multivariate time-series data values representing variables associated with a performance of the asset;

running, using said one or more said hardware processors, a multi-modal prediction model trained to determine an operating mode of the asset based on said received plural multivariate time-series data values, said multi-modal prediction model comprising a mode fidelity mixture model (MFM) corresponding to a plurality of sparse Gaussian Mixture Models (GMM), each GMM of the plurality of spar se GMMs representing the values of the variables during the performance of the asset, said each GMM comprising a Gaussian mixture function having a weighted sum of multiple component Gaussian densities using at least a sparse mixture weights coefficient model parameter, a mean component model parameter, and a sparse inverse covariance matrix component model parameter, wherein a training of said MFM comprises selecting representative sample points in the training dataset to define operating modes, said selecting comprising:

tuning, using said one or more said hardware processors, one or more hyperparameters associated with the MFM to maximize a metric for selecting the sparse mixture weights coefficient, the mean component, and the sparse inverse covariance matrix component model parameters, and utilizing said tuned hyperparameters to control a sparsity of said mixture weight, control a sparsity of said inverse covariance matrix component, and enforce a lower bound for a number of sample points in the training dataset to determine an operating mode of the operating modes for the asset;

comparing, using said one or more said hardware processors, the determined operating mode of the asset against known operating modes of the asset;

detecting, using said one or more said hardware processors, whether or not the asset exhibits an anomalous behavior based on said comparing; and invoking, using said one or more said hardware processors, in response to detecting anomalous behavior, an investigation into a cause for the anomalous behavior of the asset.

2. The method according to claim 1, wherein said tuning said hyperparameters to maximize a metric for selecting said MFM model parameters further comprises:

estimating, using said one or more said hardware processors, a model complexity value representing a number of parameters to be estimated in a GMM.

3. The method according to claim 2, wherein said tuning said one or more hyperparameters comprises:

solving, at said one or more hardware processors, an optimization problem comprising a loglikelihood function adapted to determine the hyperparameter used to control said mixture weight sparsity, the hyperparameter used to control a sparsity for inverse covariance matrix, and the hyperparameter representing the lower bound on the number of sample points for establishing an operating mode of the asset using said MFM; and computing, at said one or more hardware processors, the model complexity value as a function of a number of non-zero mixture weights in one or more sparsified inverse covariance matrices associated with a subset of non-zero dominant mixture weights and a number of non-zero weights in the MFM model, said solving said optimization problem using said model complexity value.

4. The method according to claim 1, wherein said plural multivariate time-series data values are historical data obtained from said asset, said anomalous behavior comprising an outlier in the asset's behavior.

5. The method according to claim 1, wherein said plural multivariate time-series data values are historical data obtained from said asset, said determined mode of operation being a mode of operation, said method further comprising:

assigning one or more of: said mode of operation to said asset, and an associated time period of when said asset operated in said operating mode.

6. The method according to claim 1, wherein said plural multivariate time-series data values are new sample values obtained from a current operation of said asset, said method further comprising:

computing, by said one or more said hardware processors running said MFM with said new sample values, an anomalous condition score;

comparing, using said one or more hardware processors, said anomalous condition value against a threshold value;

responsive to said anomalous condition value comparing, using said one or more hardware processors to detect an anomalous condition of said asset; and automatically generating, using said one or more hardware processors, a notification of said detected anomalous condition for communication to a user via an interface device.

7. The method according to claim 1, wherein said asset is used to build a product, said method further comprising:

obtaining, using said one or more said hardware processors, a behavior or measurement from multiple identical products produced by one or more assets used to build the products;

assessing different groups of the identical products based on different behaviors or measurements;

for each groups of identical products, identifying a respective asset used to build the products of each group;

determining a root cause for the different behaviors or measurements of the products from each said respective group by:

detecting one or more modes of operation of each respective asset obtained by running, for each respective asset, using said one or more said hardware processors, said trained prediction model with respective historical multivariate time-series data values of that respective asset; and comparing respective determined modes of operations of said respective assets; and based on said compared respective determined modes of operation, adjusting a configuration of an asset based on a determined root cause reason for the different behaviors or measurements.

8. A system for evaluating a state of an asset comprising:

a hardware processor and a non-transitory computer-readable memory coupled to the processor, wherein the memory comprises instructions which, when executed by the hardware processor, cause the hardware processor to:

receive plural multivariate time-series data values representing variables associated with a performance of the asset;

run a multi-modal prediction model trained to determine an operating mode of the asset based on said received plural multivariate time-series data values, said multi-modal prediction model comprising a mode fidelity mixture model (MFM) corresponding to a plurality of sparse Gaussian Mixture Models (GMM), each GMM of the plurality of spar se GMMs representing the values of the variables during the performance of the asset, said each GMM comprising a Gaussian mixture function having a weighted sum of multiple component Gaussian densities using at least a sparse mixture weights coefficient model parameter, a mean component model parameter, and a sparse inverse covariance matrix component model parameter, wherein a training of said MFM comprises selecting representative sample points in the training dataset to define operating modes, said selecting comprising:

tuning one or more hyperparameters associated with the MFM to maximize a metric for selecting the sparse mixture weights coefficient, the mean component, and the sparse inverse covariance matrix component model parameters, and utilizing said tuned hyperparameters to control a sparsity of said mixture weight, control a sparsity of said inverse covariance matrix component, and enforce a lower bound for a number of sample points in the training dataset to determine an operating mode for the asset;

compare the determined operating mode of the asset against known operating modes of the asset;

detect whether or not the asset exhibits an anomalous behavior based on said comparing; and invoke, in response to detecting anomalous behavior, an investigation into a cause for the anomalous behavior of the asset.

9. The system according to claim 8, wherein to tune said additional hyperparameters to maximize a metric for selecting said MFM, the processor is further configured to:

estimate a model complexity value representing a number of parameters to be estimated in a GMM.

10. The system according to claim 9, wherein said tuning said one or more hyperparameters comprises:

solving, at said one or more hardware processors, an optimization problem comprising a loglikelihood function adapted to determine the hyperparameter used to control said mixture weight sparsity, the hyperparameter used to control a sparsity for inverse covariance matrix, and the hyperparameter representing a lower bound on a number of sample points for establishing an operating mode of the asset using said MFM; and computing, at said one or more hardware processors, the model complexity value as a function of a number of non-zero mixture weights in one or more sparsified inverse covariance matrices associated with a subset of non-zero dominant mixture weights and a number of non-zero weights in the MFM model, said solving said optimization problem using said model complexity value.

11. The system according to claim 8, wherein said plural multivariate time-series data values are historical data obtained from said asset, said anomalous behavior comprising an outlier in the asset's behavior.

12. The system according to claim 8, wherein said plural multivariate time-series data values are historical data obtained from said asset, said determined mode of operation being a mode of operation, said processor being further configured to:

assign one or more of: said mode of operation to said asset, and an associated time period of when said asset operated in said operating mode.

13. The system according to claim 8, wherein said plural multivariate time-series data values are new sample values obtained from a current use of said asset, said processor being further configured to:

run said MFM with said new sample values to compute an anomalous condition score;

compare said anomalous condition value against a threshold value;

responsive to said anomalous condition value comparing, detect an anomalous condition of said asset; and automatically generate a notification of said detected anomalous condition for communication to a user via an interface device.

14. The system according to claim 8, wherein said asset is used to build a product, said processor being further configured to:

obtain a behavior or measurement from multiple identical products produced by one or more assets used to build the products;

assess different groups of the identical products based on different behaviors or measurements;

for each groups of the identical products, identify a respective asset used to build the products of each group;

determine a root cause for the different behaviors or measurements of the products from each said respective group by:

detecting one or more modes of operation of each respective asset obtained by running, for each respective asset, said trained prediction model with respective historical multivariate time-series data values of that respective asset; and comparing respective determined modes of operations of said respective assets; and based on said compared determined modes of operation, adjust a configuration of an asset based on a determined root cause reason for the different behaviors or measurements.

15. A computer program product comprising a non-transitory computer-readable storage medium having a computer-readable instructions stored therein, wherein the computer-readable instructions, when executed on a computer system comprising at least one hardware processor, causes the hardware processor to:

receive plural multivariate time-series data values representing variables associated with a performance of an asset;

run a multi-modal prediction model trained to determine an operating mode of the asset based on said received plural multivariate time-series data values, said multi-modal prediction model comprising a mode fidelity mixture model (MFM) corresponding to a plurality of sparse Gaussian Mixture Models (GMM), each GMM of the plurality of spar se GMMs representing the values of the variables during the performance of the asset, said each GMM comprising a Gaussian mixture function having a weighted sum of multiple component Gaussian densities using at least a sparse mixture weights coefficient model parameter, a mean component model parameter, and a sparse inverse covariance matrix component model parameter, wherein a training of said MFM comprises selecting representative sample points in the training dataset to define operating modes, said selecting comprising:

tuning one or more hyperparameters associated with the MFM to maximize a metric for selecting the sparse mixture weights coefficient, the mean component, and the sparse inverse covariance matrix component model parameters, and utilizing said tuned hyperparameters to control a sparsity of said mixture weight, control a sparsity of said inverse covariance matrix component, and enforce a lower bound for a number of sample points in the training dataset to determine an operating mode for the asset;

compare the determined operating mode of the asset against known operating modes of the asset;

detect whether or not the asset exhibits an anomalous behavior based on said comparing; and invoke, in response to detecting anomalous behavior, an investigation into a cause for the anomalous behavior of the asset.

16. The computer program product according to claim 15, wherein to tune said additional hyperparameters to maximize a metric for selecting said MFM, the processor is further configured to:

estimate a model complexity value representing a number of parameters to be estimated in a GMM.

17. The computer program product according to claim 16, wherein said tuning said one or more hyperparameters comprises:

solving, at said one or more hardware processors, an optimization problem comprising a loglikelihood function adapted to determine the hyperparameter used to control said mixture weight sparsity, the hyperparameter used to control a sparsity for inverse covariance matrix, and the hyperparameter representing a lower bound on a number of sample points for establishing an operating mode of the asset using said MFM; and computing, at said one or more hardware processors, the model complexity value as a function of a number of non-zero mixture weights in one or more sparsified inverse covariance matrices associated with a subset of non-zero dominant mixture weights and a number of non-zero weights in the MFM model, said solving said optimization problem using said model complexity value.

18. The computer program product according to claim 15, wherein said plural multivariate time-series data values are new sample values obtained from a current use of said asset, said instructions, when executed by the processor, further cause the processor to:

run said MFM with said new sample values to compute an anomalous condition score;

compare said anomalous condition value against a threshold value;

responsive to said anomalous condition value comparing, detect an anomalous condition of said asset; and automatically generate a notification of said detected anomalous condition for communication to a user via an interface device.

19. The computer program product according to claim 15, wherein said asset is used to build a product, said instructions, when executed by the processor, further causing the processor to:

obtain a behavior or measurement from multiple identical products produced by one or more assets used to build the products;

assess different groups of the identical products based on different behaviors or measurements;

for each groups of identical products, identify a respective asset used to build the products of each group;

determine a root cause for the different behaviors or measurements of the products from each said respective group by:

detecting one or more modes of operation of each respective asset obtained by running, for each respective asset, said trained prediction model with respective historical multivariate time-series data values of that respective asset; and comparing respective determined modes of operations of said respective assets; and based on said compared determined modes of operation, adjust a configuration of an asset based on a determined root cause reason for the different behaviors or measurements.

\* \* \* \* \*